US008140844B2

(12) United States Patent
Tanizawa et al.

(10) Patent No.: US 8,140,844 B2
(45) Date of Patent: Mar. 20, 2012

(54) SERVER APPARATUS, TERMINAL DEVICE, AND METHOD FOR PERFORMING IP MULTICAST COMMUNICATION

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1186 days.

(21) Appl. No.: 11/705,495

(22) Filed: Feb. 13, 2007

(65) Prior Publication Data

US 2008/0028211 A1 Jan. 31, 2008

(30) Foreign Application Priority Data

Jul. 26, 2006 (JP) ................................ 2006-203628

(51) Int. Cl.
*H04L 29/06* (2006.01)

(52) U.S. Cl. ...................................................... 713/163

(58) Field of Classification Search .................. 713/163
See application file for complete search history.

(56) References Cited

U.S. PATENT DOCUMENTS

| | | | | |
|---|---|---|---|---|
| 7,434,046 | B1 * | 10/2008 | Srivastava | 713/163 |
| 7,454,518 | B1 * | 11/2008 | Cain et al. | 709/238 |
| 7,502,927 | B2 * | 3/2009 | Trostle et al. | 713/163 |
| 2001/0023487 | A1 * | 9/2001 | Kawamoto | 713/202 |
| 2003/0083046 | A1 * | 5/2003 | Mathis | 455/412 |
| 2005/0050157 | A1 * | 3/2005 | Day | 709/217 |
| 2005/0210104 | A1 * | 9/2005 | Torvinen | 709/205 |
| 2006/0119882 | A1 * | 6/2006 | Harris et al. | 358/1.15 |
| 2006/0171541 | A1 * | 8/2006 | Horn et al. | 380/278 |
| 2007/0217416 | A1 * | 9/2007 | Okuda | 370/390 |
| 2010/0100605 | A1 * | 4/2010 | Allen et al. | 709/217 |

FOREIGN PATENT DOCUMENTS

| | | | |
|---|---|---|---|
| JP | 2004-336160 | | 11/2004 |
| JP | 2005-202869 | | 7/2005 |
| JP | 2005202869 | * | 7/2005 |
| JP | 2005-277806 | | 10/2005 |

OTHER PUBLICATIONS

Arkko, J. et al., "Key Management Extensions for Session Description Protocol (SDP) and Real Time Streaming Protocol (RTSP)," Royal Institute of Technology, Network Working Group, RFC 4567, Standard Track, pp. 1-30, (Jul. 2006).

Arkko, J. et al., "MIKEY: Multimedia Internet KEYing," Ericson Research, Network Working Group, RFC 3830, Standard Track, pp. 1-66, (Aug. 2004).

Notice of Rejection issued by the Japanese Patent Office on Jul. 15, 2008, for Japanese Patent Application No. 2006-203628, and Partial English Translation of Office Action.

(Continued)

*Primary Examiner* — Nathan Flynn
*Assistant Examiner* — Abdullah Almamun
(74) *Attorney, Agent, or Firm* — Finnegan, Henderson, Farabow, Garrett & Dunner, L.L.P.

(57) ABSTRACT

A presence table stores therein presence information. A storage unit stores therein in associated manner a terminal identifier unique each of a plurality of terminals and an encryption key to be used for multicast communication within a multicast group. A receiving unit receives a subscription request message from a first terminal from among the terminals. The subscription message includes the terminal identifier of the first terminal, and a request requesting subscription to the presence information present in the storage unit. An acquiring unit acquires the encryption key from the storage unit by using the terminal identifier of the first terminal. A transmitting unit transmits acquired encryption key to the first terminal.

16 Claims, 22 Drawing Sheets

OTHER PUBLICATIONS

Nemaneypour et al., "A Group Key Management Scheme for Secure Multicast Increasing Efficiency of Key Distribution in leave Operation," IEICE Technical Report (Jul. 22, 2005), 105:1-8.

Ueno et al., "Proposal of Multicast Architecture for Mobile Networks using Presence Information," IEICE Technical Report (Jul. 26, 2002), 102: 25-30.

Watanabe et al., "Proposal of Security Architecture for IP Multicast Routing Protocol," IEICE Technical Report (Jul. 18, 2002), 102:61-67.

Hamano et al., "Extension of Key Management protocol for Multicast Communications," IEICE Technical Report (Apr. 23, 1998), 98:9-16.

* cited by examiner

| PRESENTITY NAME | GROUP | URI |
|---|---|---|
| PRESENCE-A | | Presence-A@example.com |
| PRESENCE-B | | Presence-B@example.org |
| GROUP-X | O | Group-X@example.com |
| GROUP-Y | O | Group-Y@example.com |

| PRESENTITY NAME | PRESENCE INFORMATION | |
|---|---|---|
| | BASIC | LOCATION |
| PRESENCE-A | OPEN | LOCATION-A |
| PRESENCE-B | CLOSE | LOCATION-A |
| GROUP-X | OPEN | |
| GROUP-Y | OPEN | |

| URI | WATCHER LIST |
|---|---|
| Presence-A@example.com | w1@example.com, w2@example.com |
| Presence-B@example.org | w1@example.com, w3@example.com, w1@example.org |
| Group-X@example.com | wgx1@example.com, wgx2@example.com, wgx3@example.org |
| Group-Y@example.com | wgy1@example.com, wgy2@example.com, wgy3@example.org |

| GROUP URI | WATCHER LIST |
|---|---|
| Group-X@example.com | wgx1@example.com, wgx2@example.com, wgx3@example.org |
| Group-Y@example.com | Presence.basic= open && presence.location= location-A |

| GROUP URI | MULTICAST ADDRESS |
|---|---|
| Group-X@example.com | 224.100.0.1 |
| Group-Y@example.com | 224.100.0.2 |

| GROUP URI | KEY INFORMATION |
|---|---|
| Group-X@example.com | XXXXXXXXXXXXXXXXXXXXXXXX1234 |
| Group-Y@example.com | YYYYYYYYYYYYYYYYYYYYYYYY5678 |

FIG.11

```
・ <?xml version="1.0"encoding="UTF-8"?>
・ <presence xmlns="uri:ietf:params:xml:ns:pidf"xmlns:gkm="urn:example.com:gkm"
・         Entity="pres:group-X@example.com">
・ <tuple id="normalstatus">
・   <status>
・     <basic>open</basic>
・   </status>
・   <contact priority="0.8">sip:groupX-owner@example.com"</contact>
・   <gkm:mikey-data> XXXXXXX123345XXXXXXXXX</gkm:mikey-data>
・   <gkm:multicast-address> 224.100.0.1</gkm:mikey-data>
・  </tuple>
・ </presence>
・ <presence xmlns="uri:ietf:params:xml:ns:pidf"
・         Entity="pres:alice@example.com">
・ <tuple id="normalstatus">
・   <status>
・     <basic>open</basic>
・   </status>
・   <contact priority="0.8">sip:groupX-owner@example.com"</contact>
・ </tuple>
・ </presence>
```

FIG.12

```
・ <?xml version="1.0"encoding="UTF-8"?>
・ <presence xmlns="uri:ietf:params:xml:ns:pidf"xmlns:gkm="urn:example.com:gkm"
・         Entity="pres:group-X@example.com">
・  <tuple id="normalstatus">
・   <status>
・     <basic>open</basic>
・   </status>
・   <contact priority="0.8">sip:groupX-owner@example.com"</contact>
・   <gkm:mikey-data> YYYYYYYY9876YYYYYYYY</gkm:mikey-data>
・  </tuple>
・ </presence>
```

SERVER APPARATUS, TERMINAL DEVICE, AND METHOD FOR PERFORMING IP MULTICAST COMMUNICATION

CROSS-REFERENCE TO RELATED APPLICATIONS

This application is based upon and claims the benefit of priority from the prior Japanese Patent Application No. 2006-203628, filed on Jul. 26, 2006; the entire contents of which are incorporated herein by reference.

BACKGROUND OF THE INVENTION

1. Field of the Invention

The present invention generally relates to a technology for performing Internet protocol (IP) multicast communication, and specifically relates to a technology for performing IP multicast communication on systems that operate on session control protocols.

2. Description of the Related Art

Recently, communication systems, such as an Internet telephone system, that uses the session initiation protocol (SIP) that controls multimedia sessions over an IP network, have been developed.

When performing IP multicast communication with a SIP-based communication system, to enhance security, it is desirable that terminals that communicate with each other exchange an encryption key, and communicate by messages that are encrypted with the encryption key.

J. Arkko et al., "RFC 3830, MIKEY: Multimedia Internet KEYing" ([online], August 2004, retrieved from the Internet: <URL: http://www.ietf.org/rfc/rfc3830.txt>) discloses a technology called as Multimedia Internet KEYing (MIKEY), which is a standardized protocol for exchanging an encryption key applicable to SIP. When applying a method according to J. Arkko et al. to SIP, terminals that perform encrypted communication exchange an encryption key in accordance with an offer-answer model in principle.

However, in the method according to J. Arkko et al., the terminals need to exchange the encryption key one to one, so that there is a possibility of increasing a processing load during the IP multicast communication.

For example, when performing the IP multicast communication with an IP multicast group in which a number of terminals are registered as a member, each member of the IP multicast group need to exchange a key with all the other members in the group. Because the IP multicast communication can be started only after the key exchange of all the members has completed, it takes longer time to start the communication thereby resulting in lower cost performance. Furthermore, members of the multicast group are fixed, consequently, therefore, for example, a multicast to a group of terminals that is grouped based on presence information cannot be performed.

SUMMARY OF THE INVENTION

According to an aspect of the present invention, a server apparatus for managing an encryption key used for multicast communication between a plurality of terminals includes a first storage unit configured to store therein presence information including a communication state of the terminals; a second storage unit configured to store therein in associated manner a terminal identifier unique to each of the terminals and an encryption key to be used for multicast communication within a multicast group to which each of the terminal belongs; a receiving unit configured to receive a subscription request message from a first terminal from among the terminals, the subscription request message including a first terminal identifier unique to the first terminal and a request requesting subscription to presence information stored in the first storage unit; an acquiring unit configured to acquire a first encryption key to be used for multicast communication within a first multicast group to which the first terminal belongs from the second storage unit by using the first terminal identifier; and a transmitting unit configured to transmit acquired first encryption key to the first terminal.

According to another aspect of the present invention, a terminal that is connectable via a network to a server apparatus for managing presence information and included in a multicast group as a target for performing multicast communication includes a transmitting unit configured to transmit a subscription request message that requests subscription to the presence information to the server apparatus; and a receiving unit configured to receive an encryption key that the multicast group uses for multicast communication from the server apparatus.

According to still another aspect of the present invention, a communication method for managing an encryption key to be used for multicast communication between a plurality of terminals by using a server apparatus that includes a first storage unit and a second storage unit, the first storage unit being configured to store therein presence information, and the second storage unit being configured to store therein in associated manner a terminal identifier unique to each of the terminals and the encryption key, includes receiving a subscription request message from a first terminal from among the terminals, the subscription request message requesting subscription to the presence information present in the first storage unit, and the subscription request message including a first terminal identifier unique to the first terminal; acquiring the encryption key to be used for the multicast communication within the multicast group to which the first terminal belongs from the second storage unit by using the first terminal identifier; and transmitting acquired encryption key to the first terminal.

BRIEF DESCRIPTION OF THE DRAWINGS

FIG. 4 is a schematic for explaining an exemplary data structure of a presentity information table shown in FIG. 3;

FIG. 5 is a schematic for explaining an exemplary data structure of a presence information table shown in FIG. 3;

FIG. 6 is a schematic for explaining an exemplary data structure of a correspondence table shown in FIG. 3;

FIG. 7 is a schematic for explaining an exemplary data structure of a definition information table shown in FIG. 3;

FIG. 8 is a schematic for explaining an exemplary data structure of an address table shown in FIG. 3;

FIG. 9 is a schematic for explaining an exemplary data structure of a key information table shown in FIG. 3;

FIG. 11 is a schematic for explaining an example of a SIP NOTIFY REQUEST message according to the first embodiment;

FIG. 12 is a schematic for explaining an example of a SIP NOTIFY RESPONSE message according to the first embodiment;

DETAILED DESCRIPTION OF THE INVENTION

Exemplary embodiments of the present invention are explained below in detail with reference to accompanying drawings.

A server apparatus according to a first embodiment of the present invention performs a key exchange process for IP multicast between members of a multicast group in advance by using a presence server function, which was conventionally not used in the IP multicast communication. With this configuration, it is possible to improve cost performance by reducing the time (overhead) until secure IP multicast communication starts in the SIP-based system, which conventionally requires an excessive period because the key is exchanged just before starting the communication.

Moreover, message transmission for a key exchange protocol and message transmission for presence information are integrated, thereby simplifying the system configuration of the server apparatus and reduce network traffic.

The presence information is information that indicates a state of a terminal, a user, a group to which the user belongs, and an application program, for example, whether the terminal is available to communicate (online or offline), location information of the user's attendance, availability of the application program, and the like.

Figure 1:
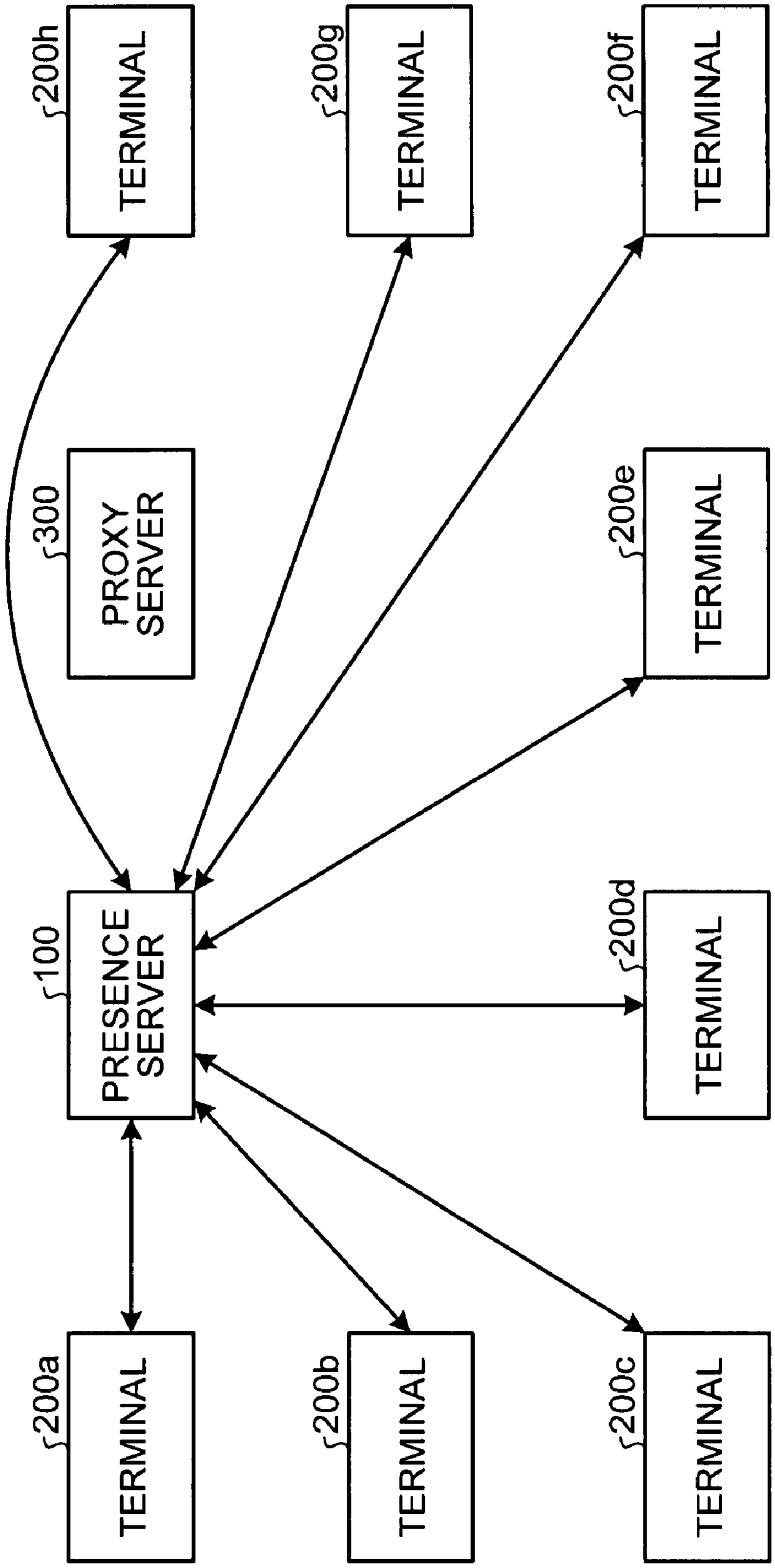
FIG. 1 is a schematic for explaining a communication system according to a first embodiment of the present invention.

A communication system according to the first embodiment is a SIP-based system. The communication system according to the first embodiment can be an internal telephone system for business, a teleconference system, and a chat system all of which are based on IP. As shown in FIG. 1, the communication system includes a presence server 100, a plurality of terminals 200*a* to 200*h*, and a proxy server 300. FIG. 1 does not depict physical connections, but is a schematic for explaining paths that exchange SIP messages.

The terminals 200*a* to 200*h* are devices that have a client function of a SIP-based system (SIP user agent (SIP UA)). The terminals 200*a* to 200*h* have the same or almost the same configuration, and part or all of the terminals 200*a* to 200*h* is sometimes simply referred to as the terminal 200 or the terminals 200 in some following description.

The proxy server 300 is a standard SIP proxy server that has a function of transferring SIP messages, and transfers SIP messages between the presence server 100 and the terminals 200.

The presence server 100 manages presence information of each presentity in the communication system. The presentity is a device that supplies its presence information to some other device. On the other hand, a device that receives the presence information from the presentity is a watcher. The presentity and the watcher are not limited to the terminals 200 generally function as the presentity and the watcher, however, devices other than the terminals 200 can function as the presentity and the watcher.

Figure 2:
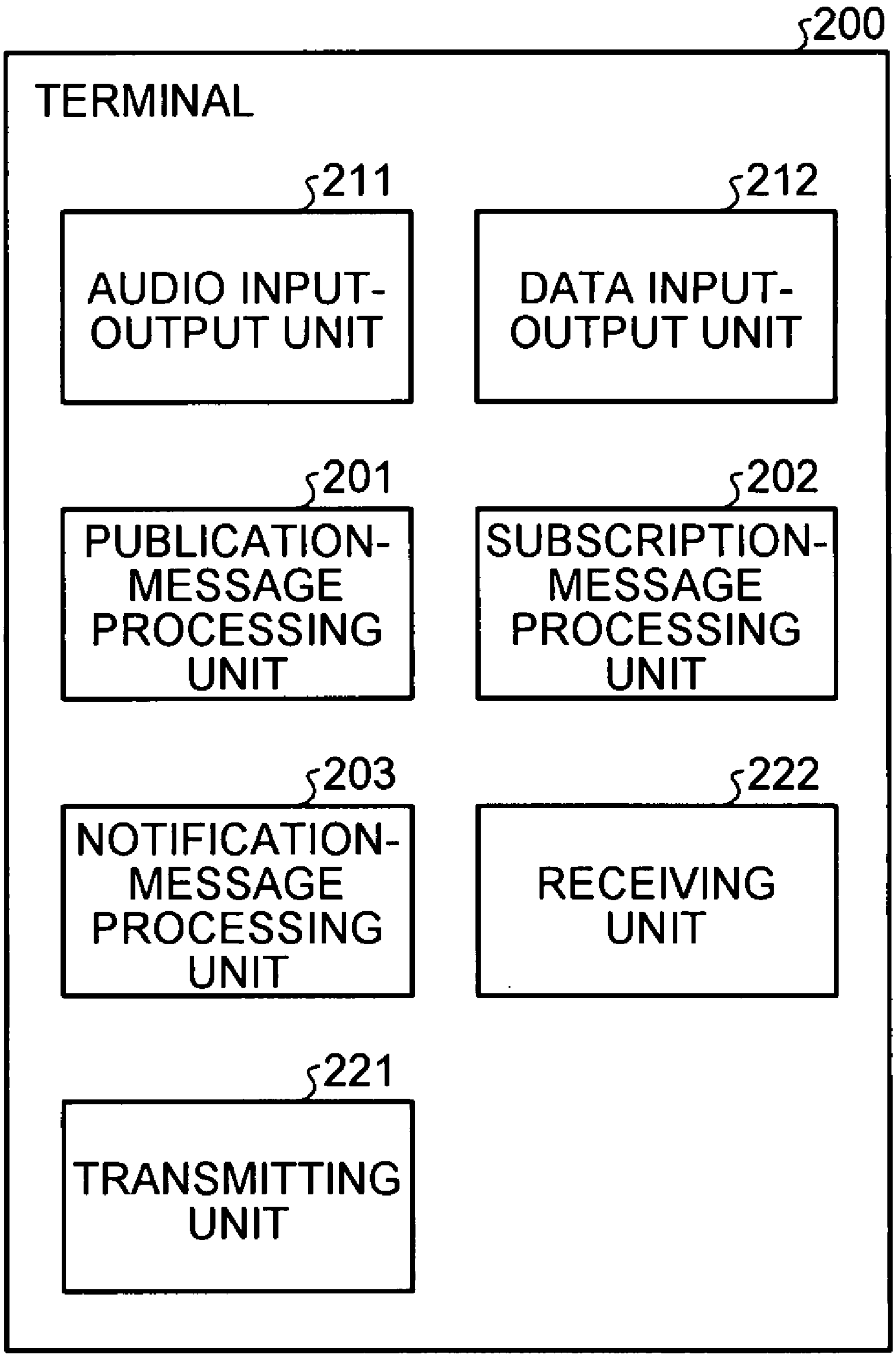
FIG. 2 is a block diagram of a terminal shown in FIG. 1.

As shown in FIG. 2, each of the terminals 200 includes an audio input-output unit 211, a data input-output unit 212, a publication-message processing unit 201, a subscription-message processing unit 202, a notification-message processing unit 203, a transmitting unit 221, and a receiving unit 222.

The audio input-output unit 211 receives voice and sound, such as a speech by a user, and outputs voice and sound, which can be transmitted from another of the terminals 200, to the user. The audio input-output unit 211 can be configured to include a microphone and a speaker, or a telephone handset.

The data input-output unit 212 receives and outputs various data other than audio data. The data input-output unit 212 can be configured to include operation buttons for inputting telephone numbers, a liquid crystal display for displaying data.

The combination of the audio input-output unit 211 and the data input-output unit 212 can materialize a user interface function like a typical telephone terminal.

The publication-message processing unit 201 performs processing related to a publication message to publish presence information to the presence server 100. Specifically, the publication-message processing unit 201 publishes a SIP PUBLISH message to the presence server 100 as a publication message to publish presence information. The form of message is not limited to this, but any form of message that can publish presence information can be used.

Because each of the terminals 200*a* to 200*h* includes the publication-message processing unit 201, any of the terminals 200*a* to 200*h* can become a presentity by providing its presence information to the presence server 100.

The subscription-message processing unit 202 performs processing related to a subscription request message that is a message to the presence server 100 for requesting to subscribe information of another presentity. Specifically, the subscription-message processing unit 202 transmits a SIP SUBSCRIBE message to the presence server 100 as the subscription request message to request subscription. The form of message is not limited to this, but any form of message that can transmit a subscription request can be used.

The notification-message processing unit 203 performs processing related to an information notification message to notify presence information of another presentity received from the presence server 100. Specifically, the notification-message processing unit 203 receives a SIP NOTIFY message notified to receive notified presence information as an information notification message, and acquires contents of the received information. The form of message is not limited to this, but any form of message that can receive notification of presence information of another presentity can be used.

Because each of the terminals 200*a* to 200*h* includes the subscription-message processing unit 202 and notification-message processing unit 203, any of the terminals 200*a* to 200*h* can become a watcher by receiving notification relating to information of a presentity from the presence server 100 and become a presentity by sending notification to the presence server 100.

The transmitting unit 221 transmits various messages and media data, such as audio data and image data, to the presence server 100 or one or more of the terminals 200.

The receiving unit 222 receives various messages and media data, such as audio data and image data, from the presence server 100 or one or more of the terminals 200.

The transmitting unit 221 and the receiving unit 222 transmit media data by secure IP multicast communication according to the secure real-time transport protocol (SRTP). To perform secure communication, the transmitting unit 221 and the receiving unit 222 store information of a plurality of keys to be used for encoding and decoding in a storage unit.

When transmitting media data, the transmitting unit 221 encodes the media data with an appropriate encryption key selected from among the keys present in the storage unit and then transmits the encoded media data. When receiving media data, the receiving unit 222 receive the media data, identifies the encryption key that has been used to encrypt the media data, selects an appropriate encryption key from among the keys present in the storage unit, and decodes the received media data with the selected encryption key.

Figure 3:
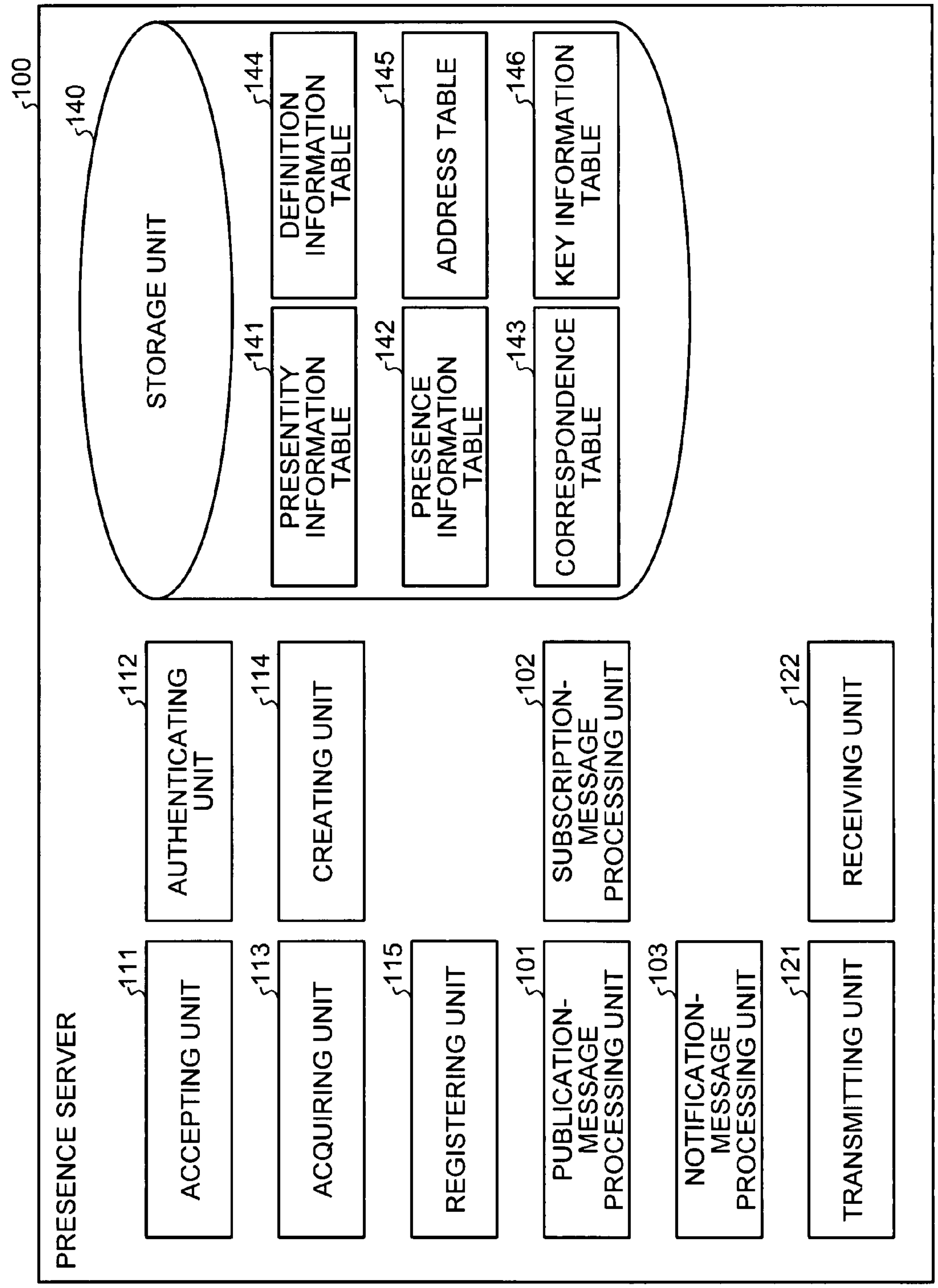
FIG. 3 is a block diagram of a server apparatus shown in FIG. 1.

As shown in FIG. 3, the presence server 100 includes a storage unit 140, an accepting unit 111, an authenticating unit 112, an acquiring unit 113, a creating unit 114, a registering unit 115, a publication-message processing unit 101, a subscription-message processing unit 102, a notification-message processing unit 103, a transmitting unit 121, and a receiving unit 122.

The storage unit 140 stores therein various data to be used in communication processing performed by the presence server 100. The storage unit 140 can be any typical storage media such as a hard disk drive (HDD), an optical disc, a memory card, and a random access memory (RAM).

The storage unit 140 stores therein, for example, a presentity information table 141, a presence information table 142, a correspondence table 143, a definition information table 144, an address table 145, and a key information table 146.

The presentity information table 141 stores therein information relating to the presentities. As shown in FIG. 4, the presentity information table 141 stores therein and associates a presentity name with a group flag, and a uniform resource identifier (URI), which is an identifier that identifies a presentity.

The group flag is information that indicates whether the presentity is a multicast group rather than a normal presentity. If the presentity is a multicast group, the group flag is set to true. Thus, the presence server 100 can differentiate between a multicast group presentity and a normal presentity as a presentity.

The presence information table 142 stores therein presence information that indicates the current situation of each presentity. As shown in FIG. 5, the presence information table 142 stores therein and associates a presentity name with presence information. A basic element that indicates whether the presentity is available to accept a message (open or close), and a Location element that indicates the location of the presentity are stored as the presence information. However, the presence information is not limited to this, but any information relating to presence of the presentity can be employed. In a case of a multicast group presentity, the availability of the multicast address of the presentity can be expressed as open or close.

The correspondence table 143 stores therein watchers corresponding to each presentity. As shown in FIG. 6, the correspondence table 143 stores therein and associates the URI of a presentity with a watcher list. URIs included in the watcher list indicate the terminals 200 that are the members forming the corresponding multicast group, when the presentity is a multicast group presentity.

The definition information table 144 stores therein information that defines members that form a multicast group. As shown in FIG. 7, the definition information table 144 stores therein group definition in which the URI of a multicast group presentity is associated with a URI list of group members of the multicast group. In addition, the definition information table 144 can store therein group definition information. The group definition information is conditions that the group members should satisfy to define constituent members of the multicast group.

For example, according to group definition information of the second record in FIG. 7, the group members are defined in accordance with conditions of presence information such that a presence state of the member is seating, and the terminal is connected from office A.

In other words, in FIG. 7, the group definition information of the multicast group of the second record is specified such that the group members are the terminals 200 that have presence information of which the basic element is open, and the location element is location-A.

If a multicast group is defined with a URI list of some of the terminals 200 as shown in the group definition information in the first record in FIG. 7, the group members of the multicast group are equal to the watcher list to the multicast group as a presentity in the correspondence table 143.

By contrast, if a multicast group is defined in terms of presence information, some of the terminals 200 that have presence information satisfying conditions are selected with reference to the presentity information table 141 and the presence information table 142, so that the URI list of the terminals 200 to be the members of the multicast group can be obtained at a timing as desired.

The URI list of the terminals 200 obtained in this way is registered into the watcher list in the correspondence table 143. Thus, the members of the multicast group that reflect the current presence information can be stored in the correspondence table 143.

The address table 145 stores therein a multicast address of the multicast group. As shown in FIG. 8, the address table 145 stores therein and associates a group URI that is the identifier (URI) of a multicast group, with a multicast address.

The key information table 146 stores therein information of an encryption key that is used in IP multicast communication in the multicast group. As shown in FIG. 9, the key information table 146 stores therein and associates the group URI with key information.

Information about an encryption key to be used for encrypted communication is stored as the key information. In the first embodiment, any encryption key, such as a secret key cryptography, can be used as the key information. A group URI can have a plurality of key information with respective identifications (key IDs).

The accepting unit 111 accepts input of various information input by a user. The information can be group definition information to be set in the definition information table 144.

The accepting unit 111 is materialized by any data input method can be used. For example, a user interface such as a keyboard, and a method of receiving group definition information from an external device via a network can be used.

The authenticating unit 112 performs authentication of external devices, such as the terminals 200. Any authenticating method can be used. For example, an authenticating method using ID and password can be used. Moreover, the authenticating unit 112 can be configured to perform authentication by using an external authenticating server (not shown) connected to the authenticating unit 112 via a network.

The acquiring unit 113 acquires key information of a multicast group for which a subscription request message is transmitted, from the key information table 146. Specifically, the acquiring unit 113 acquires the URI of a multicast group corresponding to the URI of one of the terminals 200 included in the subscription request message from the correspondence table 143, and acquires key information corresponding to the acquired URI from the key information table 146.

Moreover, the acquiring unit 113 acquires a multicast address of the multicast group for which the subscription request message is transmitted, from the address table 145. Specifically, the acquiring unit 113 acquires a multicast address corresponding to the URI acquired from the correspondence table 143 from the address table 145.

The creating unit 114 creates key information of a multicast group. For example, when the accepting unit 111 accepts creation of a new group, the creating unit 114 creates key information by generating random numbers. For key creation performed by the creating unit 114, any creating method appropriate to each encryption key to be used can be applied.

Alternatively, the creating unit 114 can be configured to use key information created by one of the terminals 200 that form the multicast group by receiving the key information, for example, with a SIP PUBLISH REQUEST message. Furthermore, the creating unit 114 can be configured to renew the key information at a timing as desired or regularly.

The registering unit 115 registers information into respective tables described above. For example, the registering unit 115 registers the key information created by the creating unit 114 into the key information table 146. In addition, the registering unit 115 registers the group definition information accepted by the accepting unit 111 into the definition information table 144.

The publication-message processing unit 101 performs processing related to a publication message received from a presentity, for example, the terminal 200*a*. For example, when the publication-message processing unit 101 is notified from the terminal 200*a* with a SIP PUBLISH REQUEST message that the presence information is changed, the publication-message processing unit 101 replies a SIP PUBLISH RESPONSE message.

In addition, the publication-message processing unit 101 saves the received presence information into the presence information table 142. When receiving presence information of a new presentity, the publication-message processing unit 101 newly adds information of the presentity into the presentity information table 141.

The subscription-message processing unit 102 performs processing related to a subscription request message received from a watcher, for example, the terminal 200*b*. For example, when receiving a SIP SUBSCRIBE REQUEST message, the subscription-message processing unit 102 replies a SIP SUBSCRIBE RESPONSE message in response.

In addition, the subscription-message processing unit 102 adds the terminal 200*b* into the watcher list in the correspondence table 143.

The notification-message processing unit 103 performs processing related to an information notification message to notify a change in presence information to be transmitted to the terminals 200. For example, when presence information of a presentity is renewed, the notification-message processing unit 103 creates a SIP NOTIFY REQUEST message for notifying the terminals 200 that are watchers to the presentity. The notification-message processing unit 103 then transmits the created message to the terminals 200. In addition, the notification-message processing unit 103 also processes a corresponding SIP NOTIFY RESPONSE message.

When the watcher list is renewed, the notification-message processing unit 103 can notify presence information to each of the terminals 200 included in the watcher list of with the SIP NOTIFY REQUEST message.

The transmitting unit 121 transmits various messages to the terminals 200. The receiving unit 122 receives various messages from the terminals 200.

Figure 10:
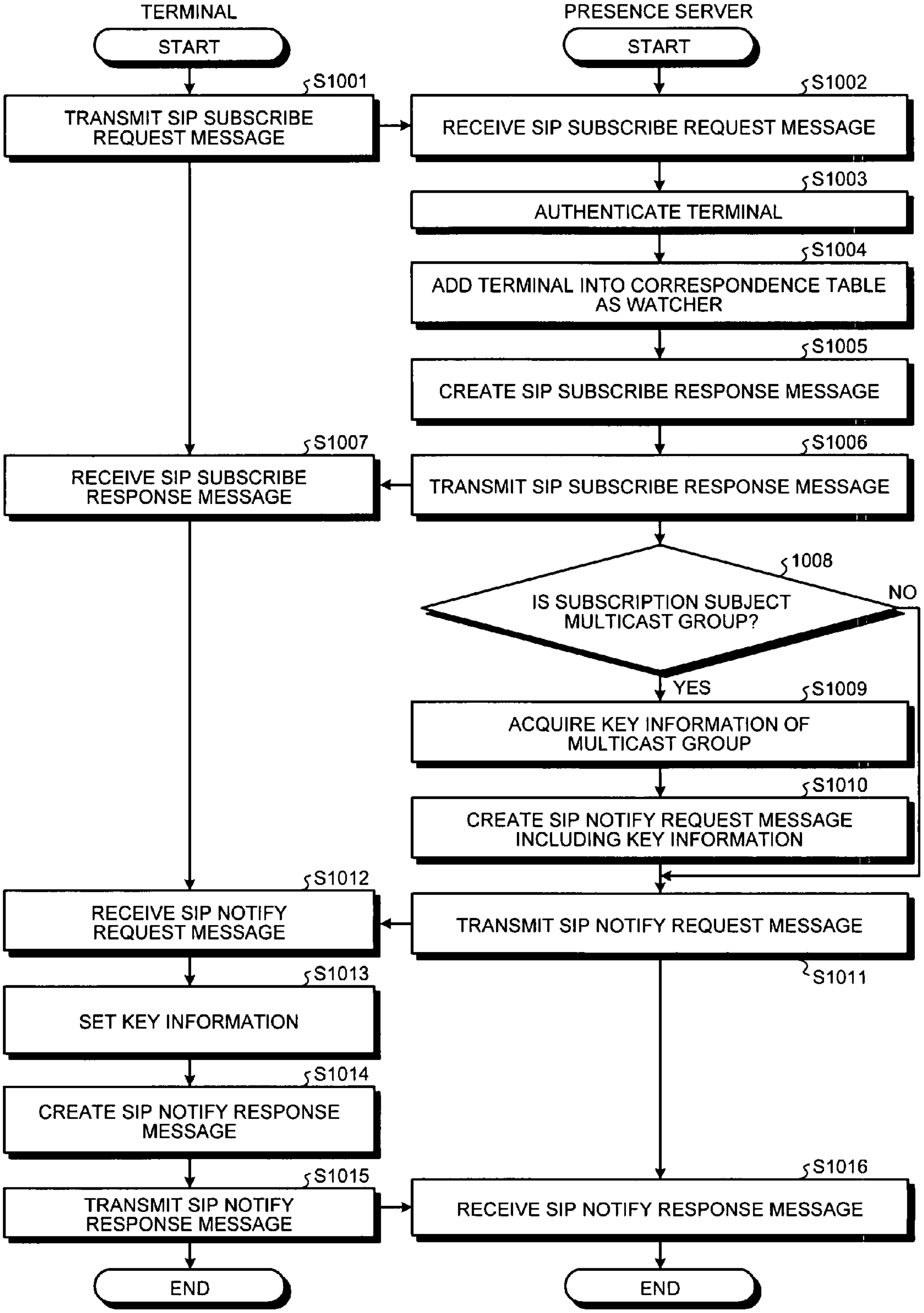
FIG. 10 is a flowchart of a key exchange process according to the first embodiment.

Next, a key exchange process performed by the presence server 100 is explained below with reference to FIG. 10. FIG. 10 is a flowchart of the key exchange process when the terminal 200*b* boots up.

To begin with, the transmitting unit 221 of the terminal 200*b* transmits a subscription request message (SIP SUBSCRIBE REQUEST message) to the presence server 100 (step S1001). The subscription request message requests registration as a watcher to a presentity as desired including a multicast group.

In this case, the terminal 200*b* has already acquired the address of the presence server 100. The SIP SUBSCRIBE REQUEST message is created by the subscription-message processing unit 202 of the terminal 200*b*. The SIP SUBSCRIBE REQUEST message includes a URI for identifying the presentity to be subscribed by the terminal 200*b*. On the other hand, when the terminal 200*b* requests subscription to a multicast group to which the terminal 200*b* itself belongs, the SIP SUBSCRIBE REQUEST message does not need to include information of the terminal 200*b*, because the information of the terminal 200*b* is managed by the correspondence table 143 in the presence server 100.

Next, the receiving unit 122 of the presence server 100 receives the SIP SUBSCRIBE REQUEST message (step S1002). The authenticating unit 112 then performs authentication of the terminal 200*b* by using authentication information included in the SIP SUBSCRIBE REQUEST message (step S1003).

If the terminal 200*b* is authenticated, the subscription-message processing unit 102 renews the correspondence table 143 to add the terminal 200*b* as a watcher to the presentity to which the terminal 200*b* requests subscription (step S1004). If, for example, there is a presentity corresponding to a multicast group of the whole system, it can be configured to add the terminal 200*b* as a watcher to the presentity.

Next, the subscription-message processing unit 102 creates a SIP SUBSCRIBE RESPONSE message (step S1005). The transmitting unit 121 then transmits the created message to the terminal 200*b* (step S1006).

The receiving unit 222 of the terminal 200*b* receives the transmitted SIP SUBSCRIBE RESPONSE message (step S1007).

Next, the notification-message processing unit 103 of the presence server 100 determines whether a subscription subject to be subscribed by the terminal 200*b* is a multicast group presentity (step S1008).

Specifically, the notification-message processing unit 103 specifies a presentity to be notified to the terminal 200*b* with reference to the correspondence table 143. Precisely, the notification-message processing unit 103 acquires the URI of a presentity that includes the terminal 200*b* as a watcher from the correspondence table 143.

The presentity specified here can be a presentity that is registered in the correspondence table 143 by an explicit request from the terminal 200*b* to be a watcher, and a multicast group that includes the terminal 200*b*.

Next, the notification-message processing unit 103 acquires a group flag corresponding to the acquired presentity URI from the presentity information table 141, and determines whether the subscription subject is a multicast group presentity, based on whether the acquired group flag is true.

If the subscription subject is a multicast group presentity (Yes at step S1008), the acquiring unit 113 acquires key information corresponding to the multicast group presentity that includes the terminal 200*b* from the key information table 146 (step S1009). In addition, the acquiring unit 113 acquires a multicast address corresponding to the URI from the address table 145.

The notification-message processing unit 103 then creates a SIP NOTIFY REQUEST message that includes the acquired key information (step S1010). The SIP NOTIFY REQUEST message includes presence information and multicast group information to be notified to the terminal 200*b*. The multicast group information is information that includes multicast address information and key information.

The notification-message processing unit 103 can be configured to encrypt the multicast group information including the key information. For example, the notification-message processing unit 103 can be configured to create a message that includes the key information encrypted in accordance with the multimedia Internet keying (MIKEY), which is a conventional key-exchange protocol.

The notification-message processing unit 103 acquires presence information from the presence information table 142 corresponding to the presentity name acquired from the correspondence table 143, and makes it as the presence information to be notified to the terminal 200*b*.

The transmitting unit 121 then transmits the created SIP NOTIFY REQUEST message to the terminal 200*b* as the first SIP NOTIFY REQUEST message in response to the SIP SUBSCRIBE REQUEST message (step S1011).

By contrast, if it is determined that the subscription subject is not a multicast group at step S1008, (No at step S1008), the key exchange process does not need to be performed. Therefore, the transmitting unit 121 transmits a normal SIP NOTIFY REQUEST message that does not include key information and include presence information only to the terminal 200*b*.

FIG. 11 is an example of a message format extended from a presence information data format (PIDF) that is a specification for presenting presence information.

The message format shown in FIG. 11 includes presence information of a presentity "alice@example.com", and presence information of a presentity, a multicast group presentity "group-X@example.com", which includes information for exchanging an encryption key according to the MIKEY key-exchange protocol.

Returning to FIG. 10, the receiving unit 222 of the terminal 200*b* receives the SIP NOTIFY REQUEST message (step S1012). Next, the notification-message processing unit 203 sets the key information included in the received SIP NOTIFY REQUEST message (step S1013). Setting the key information means that the notification-message processing unit 203 extracts the key information from the message, and incorporates the extracted key information into the terminal 200*b* so as to perform secure IP multicast communication. In addition, the notification-message processing unit 203 sets the multicast address included in the message simultaneously.

The notification-message processing unit 203 then creates a SIP NOTIFY RESPONSE message, which is a response to the SIP NOTIFY REQUEST message (step S1104).

The notification-message processing unit 203 can be configured to create a message that includes data defined in the protocol used for the key exchange such as MIKEY. For example, the created message can include ID information of the terminal 200*b* for performing mutual authentication between the terminal 200*b* and the presence server 100.

FIG. 12 is an example of a message format extended from PIDF. In the example shown in FIG. 12, a message format that includes a mutual authentication message for a multicast group "group-X@example.com" by the MIKEY key-exchange protocol is shown.

Returning to FIG. 10, the transmitting unit 221 transmits the created SIP NOTIFY RESPONSE message to the presence server 100 (step S1105). The receiving unit 122 of the presence server 100 receives the SIP NOTIFY RESPONSE message (step S1106), then the key exchange process is ended.

With the processing described above, the terminal 200*b* can efficiently perform the key exchange process by receiving the key information present in the presence server 100 without performing mutual key exchange process with the rest of the terminals 200, thereby reducing a processing load during IP multicast communication.

Next, a sequence of the key-exchange processing when the presence information of the terminal 200*a* is renewed is explained below with reference to FIG. 13.

To begin with, the transmitting unit 221 of the terminal 200*a* transmits a publication message of its presence information (SIP PUBLISH REQUEST message) to the presence server 100 (step S1301).

The SIP PUBLISH REQUEST message is created by the publication-message processing unit 201 of the terminal 200*a*.

Next, the receiving unit 122 of the presence server 100 receives the SIP PUBLISH REQUEST message (step S1302). The authenticating unit 112 then performs authentication of the terminal 200*a* by using authentication information included in the SIP PUBLISH REQUEST message (step S1303).

If the terminal 200*a* is authenticated, the publication-message processing unit 101 refers to the presentity information table 141. If the terminal 200*a* is not present in the presentity information table 141, i.e., the publication-message processing unit 101 receives the SIP PUBLISH REQUEST message from the terminal 200*a* for the first time, the publication-message processing unit 101 adds the URI of the terminal 200*a* included in the message into the presentity information table 141 (step S1304).

In addition, the publication-message processing unit 101 registers presence information included in the received message into the presence information table 142. If the terminal 200*a* has been registered as a presentity, the publication-message processing unit 101 renews corresponding presence information with the presence information included in the received message.

Next, the publication-message processing unit 101 creates a SIP PUBLISH RESPONSE message (step S1305). The transmitting unit 121 then transmits the created message to the terminal 200*a* (step S1306).

The receiving unit 222 of the terminal 200*a* receives the transmitted SIP PUBLISH RESPONSE message (step S1307).

Next, the publication-message processing unit 101 reconfigures the members of the multicast group (watcher list) defined under the conditions of presence information in the definition information table 144 (step S1308). The reason for this is that if the presence information is renewed, the members of the multicast group defined under the condition of the presence information are possibly changed.

The publication-message processing unit 101 then determines whether the multicast group is renewed (step S1309). If the multicast group is not renewed (No at step S1309), key exchange process does not need to be performed, so that the key-exchange processing is ended.

If the multicast group is renewed (Yes at step S1309), the acquiring unit 113 acquires key information of the renewed multicast group from the key information table 146 (step S1310). In addition, the acquiring unit 113 acquires the multicast address of the renewed multicast group from the address table 145.

The notification-message processing unit 103 then creates a SIP NOTIFY REQUEST message that includes the acquired key information (step S1311).

The transmitting unit 121 then transmits the created SIP NOTIFY REQUEST message to the terminal(s) 200 that is a watcher to the renewed multicast group (step S1312). URI(s) of the terminal(s) 200 to which the SIP NOTIFY REQUEST message is transmitted is acquired with reference to the correspondence table 143.

However, if merely a new watcher is added to the multicast group while no other change occurs, and none of the keys that are used in the current multicast group is renewed, it is possible for the transmitting unit 121 of the presence server 100 to transmit the SIP NOTIFY REQUEST message only to the new terminal that joins the multicast group (which is usually the terminal that transmits the SIP PUBLISH REQUEST message), and not to sent it to the rest of the terminals that form the multicast group.

Explanations for transmitting-receiving processing of the SIP NOTIFY REQUEST message and transmitting-receiving processing of the SIP NOTIFY RESPONSE message at steps S1313 to S1317 are omitted, because these transmissions are similar to the processing at steps S1012 to S1016 shown in FIG. 10.

Explanations for steps S1318 to S1321 are omitted, because those steps describe processing performed on another of the terminals 200 that are required to notify presence information, and are similar to steps S1313 to S1316.

As a result, a message transmission for exchanging a key and a message transmission for notifying presence information can be integrated, so that the system configuration can be simplified and network traffic can be reduced.

Furthermore, it does not need to simultaneously transmit a message to each of the terminals 200 included in the watcher list. Moreover, the presence server 100 can exchange SIP NOTIFY only with some of the terminals 200 that need to be newly notified of the multicast group information.

Thus, when the presence information is renewed, the key information can be distributed in advance to the terminal(s) 200 that requires the key information. This enables the system to properly maintain multicast group presentities to which presence information in the multicast group is reflected, and to transmit multicast data to the multicast group.

Figure 14:
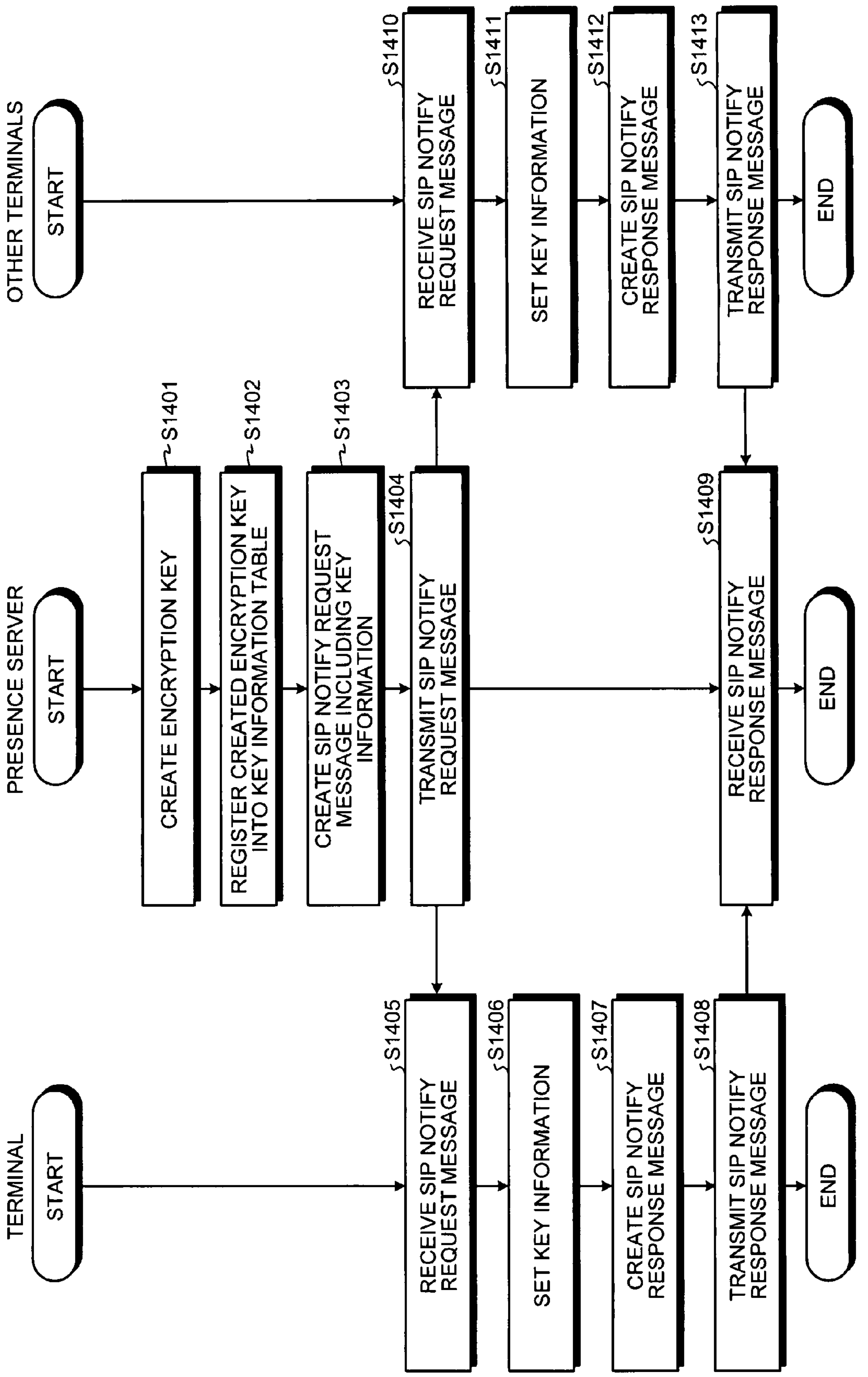
FIG. 14 is a flowchart of a key exchange process according to the first embodiment.

Next, a sequence of the key-exchange processing when the key information is renewed in the presence server 100 is explained below with reference to FIG. 14.

To begin with, the creating unit 114 of the presence server 100 creates a new encryption key at any timing as desired, for example, periodically, or when the members of the multicast group are changed (step S1401). It can be configured that the presence server 100 itself newly creates a key by generating random numbers as described above, or that one of the terminals 200 creates a key, and notifies the key with a message to the presence server 100.

Next, the registering unit 115 registers the created encryption key as key information of the corresponding multicast group into the key information table 146 (step S1402).

The notification-message processing unit 103 then creates a SIP NOTIFY REQUEST message that includes the registered key information and the multicast address (step S1403).

The transmitting unit 121 then transmits the created SIP NOTIFY REQUEST message to the terminal(s) 200 that is a watcher to the multicast group presentity of which the key information is renewed (step S1404). URI(s) of the terminal(s) 200 to which the SIP NOTIFY REQUEST message is transmitted is acquired with reference to the correspondence table 143.

Figure 13:
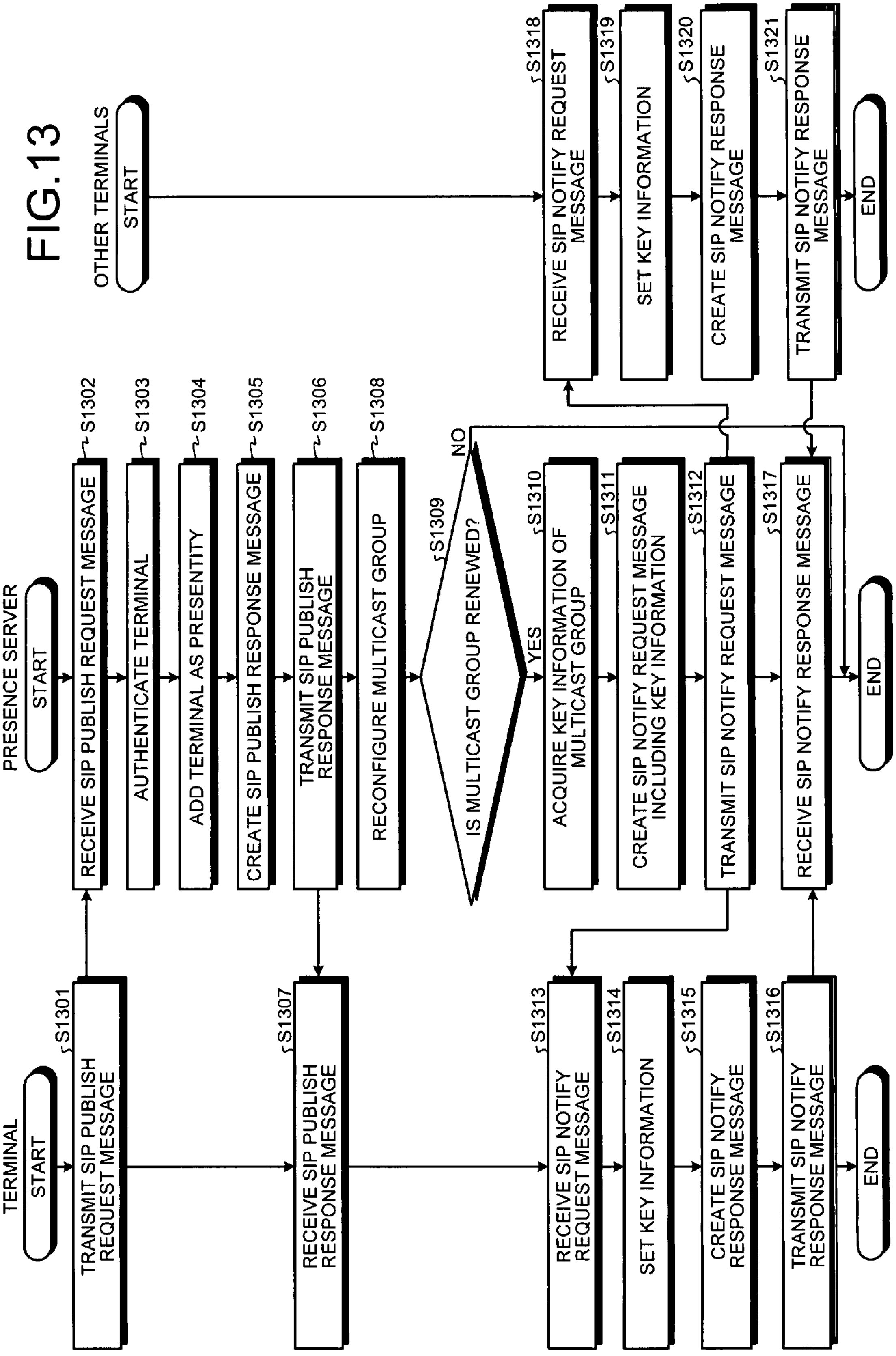
FIG. 13 is a flowchart of a key exchange process according to the first embodiment.

Explanations for transmitting-receiving processing of the SIP NOTIFY REQUEST message and transmitting-receiving processing of the SIP NOTIFY RESPONSE message at steps S1405 to S1413 are omitted, because these processing are similar to the processing at steps S1313 to S1321 shown in FIG. 13.

The transmission of the SIP NOTIFY REQUEST message does not need to be performed as soon as the SIP PUBLISH RESPONSE message is processed. For example, the presence server 100 can be configured to transmit the SIP NOTIFY REQUEST message about the key exchange simultaneously with a transmission of another SIP NOTIFY REQUEST message in response to a renewal of presentity information, multicast group information, or group definition information. Alternatively, a plurality of SIP NOTIFY REQUEST messages can be combined to be transmitted as a single SIP NOTIFY REQUEST message.

Thus, when the key information is renewed in the presence server 100, the key information can be distributed appropriately to the terminal(s) 200 that requires the renewed key information.

Figure 15:
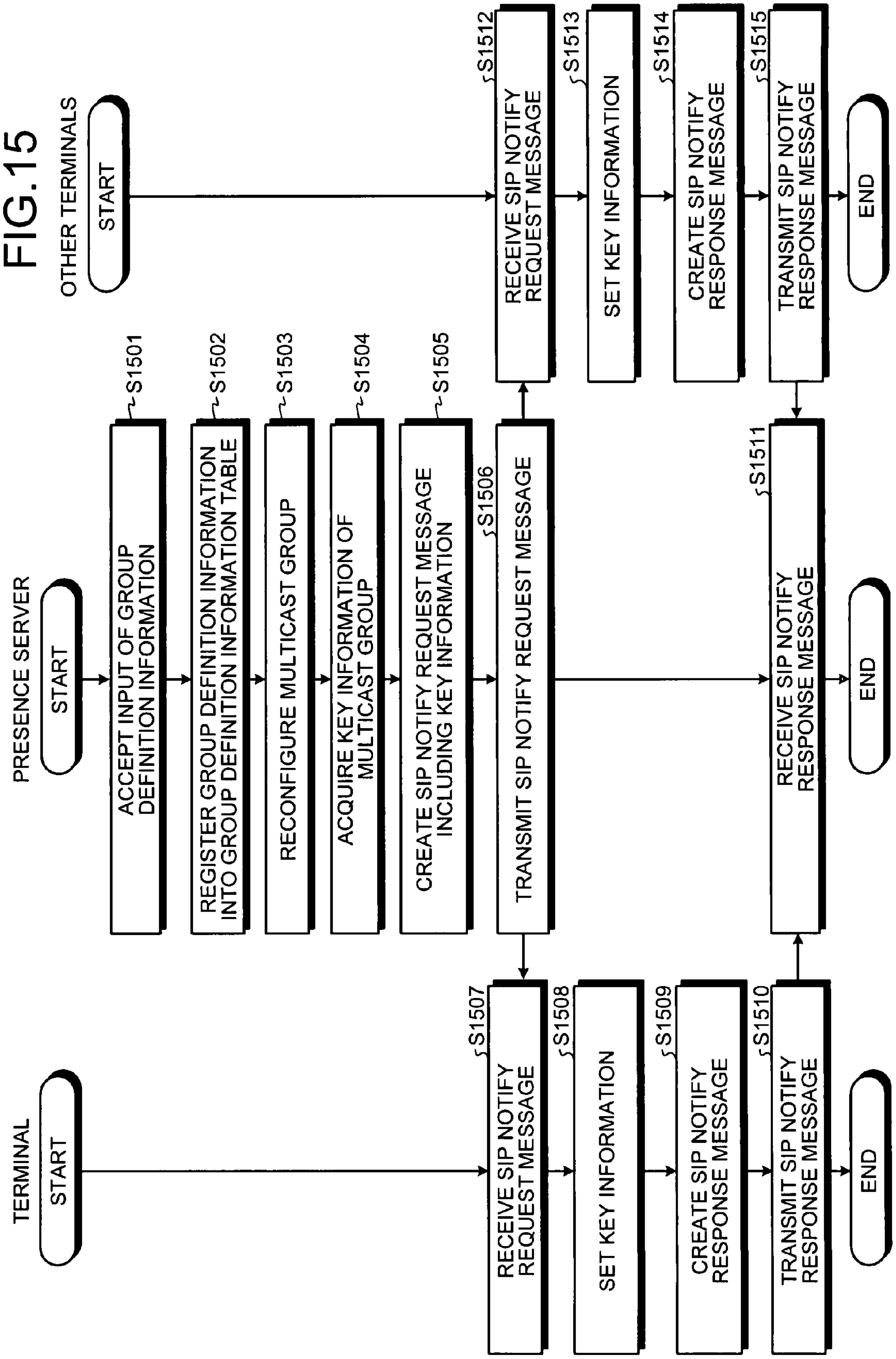
FIG. 15 is a flowchart of a key exchange process according to the first embodiment.

Next, a sequence the key exchange process when a new multicast group is defined or the multicast group definition is renewed in the presence server 100 is explained below with reference to FIG. 15.

To begin with, the accepting unit 111 of the presence server 100 receives an input of group definition information input by a user (step S1501). The registering unit 115 registers the received group definition information into the definition information table 144 (step S1502). As a result, the user can create a new multicast group definition, or renew the existing multicast group definition.

If the group definition information is defined by conditions of presence information, the notification-message processing unit 103 acquires information of the terminal(s) 200 that has presence information satisfying the conditions with reference to the presence information table 142, and reconfigures the corresponding multicast group in the correspondence table 143 (step S1503).

If the group definition information is defined by a URI list of the terminal(s) 200, the list is directly reflected to the watcher list in the correspondence table 143. Moreover, it can be configured such that, when the correspondence table 143 is renewed, the creating unit 114 creates key information, and the key information table 146 is renewed with the created key information.

Next, the acquiring unit 113 acquires key information corresponding to the multicast group of which the group definition information is added or renewed from the key information table 146 (step S1504). In addition, the acquiring unit 113 acquires the multicast address of the multicast group from the address table 145.

The notification-message processing unit 103 then creates a SIP NOTIFY REQUEST message that includes the acquired key information (step S1505).

The transmitting unit 121 then transmits the created SIP NOTIFY REQUEST message to the terminal(s) 200 that is a watcher to the multicast group of which the group definition information is added or renewed (step S1506). URI(s) of the terminal(s) 200 to which the SIP NOTIFY REQUEST message is transmitted is acquired with reference to the correspondence table 143.

Explanations for transmission of the SIP NOTIFY REQUEST message and transmission of the SIP NOTIFY RESPONSE message at steps S1507 to S1515 are omitted, because these transmissions are similar to the processing at steps S1313 to S1316 shown in FIG. 13.

The transmission of the SIP NOTIFY REQUEST message does not need to be performed as soon as the SIP PUBLISH RESPONSE message is processed. For example, the presence server 100 can be configured to transmit the SIP NOTIFY REQUEST message about the key exchange simultaneously with a transmission of another SIP NOTIFY REQUEST message in response to a renewal of presentity information, multicast group information, or group definition information. Alternatively, a plurality of SIP NOTIFY REQUEST messages can be combined to be transmitted as a single SIP NOTIFY REQUEST message.

Thus, when a new group is added or the group definition information is renewed in the presence server 100, the key information can be appropriately distributed to the terminal(s) 200 that requires the key information.

In all of the sequences of the key-exchange described above, every time only one key is exchanged within a multicast group. Thus, two or more different keys are not exchanged at the same time within the same multicast group. By employing the above sequences, the presence server 100 deals with presence information and information about the multicast group in a unified manner, as a result, the system is simplified, so that traffic and the load on the system can be reduced.

Next, data communication when secure IP multicast communication is actually performed is explained below. First, a method of selecting an encryption key when performing the data communication is explained below.

Through the above sequence, each of the terminals 200 that is included in a certain multicast group, for example, the terminal 200*c*, acquires a pair of address information and key information corresponding to the multicast group by a key-exchange protocol executed on SIP messages such as MIKEY.

The terminal 200*c* can have at least two key information per multicast group. Key information contains a key material and its ID. Hereinafter, one key information is referred to as latest effective key information, and another is referred to as effective key information.

The latest effective key information is a pair of address information and key information acquired through the above key-exchange sequence. Precisely, the terminal 200*c* stores therein the acquired pair of address information and key information as the latest effective key information of the corresponding multicast group.

The effective key information is key information having been acquired before acquiring the latest effective key information. When the terminal 200*c* acquires a new pair of address information and key information of the corresponding multicast group by such as a key-exchange protocol, the terminal 200*c* copies the latest effective key information on to the effective key information, and stores therein the acquired new key information as the latest effective key information.

If the terminal 200*c* does not have the effective key information, i.e., the terminal 200*c* acquires a pair of address information and key information through the key-exchange sequence for the first time, the terminal 200*c* copies the latest effective key information onto the effective key information. After that, the terminal 200*c* keeps at least two pairs of information, namely, the latest effective key information and the effective key information, for the corresponding multicast group, and sets those information for multicast communication. Here, the latest effective key information and the effective key information are explained with respect to the terminal 200*c*, however, any of the terminals 200 included in the multicast group performs the same procedure described above.

Thus, each of the terminals 200 included in the multicast group keeps at least two encryption keys and their IDs of the latest effective key information and the effective key information.

When receiving encrypted multicast data, the receiving unit 222 of each of the terminals 200 identifies an ID of a key used for encrypting from a packet that includes the encrypted multicast data, determines whether the key corresponding to the ID is the key included in the latest effective key information or the key included in the effective key information, and decodes the data by using an appropriate key. Such function can be achieved by SRTP.

On the other hand, one of the terminals 200 that encrypts and transmits multicast data selects an encryption key included in the effective key information of a corresponding multicast group every time when selecting a key to be used for encrypting. It is to be noted that before the key exchange of a certain key is finished within the corresponding multicast group, the communication system that includes the presence server 100 does not start the key exchange process of another key. Therefore, if multicast data is encrypted and transmitted by selecting the key included in the effective key information every time, all of the terminals 200 that form the multicast group can receive and decode the multicast data with the key that is already kept in the latest effective key information or in the effective key information.

Furthermore, another available method how to decide key information to be used is that each of the terminals 200 is notified of information of an ID of an encryption key that is currently available for use from the presence server 100 by using such as a SIP NOTIFY message, and uses the encryption key for a data transmission based on the notified information.

Next, processing for starting and ending of multicast data communication by the terminal within the multicast group is explained below. Like ordinary multicast data communication, it can be configured that a sender terminal simply transmits encrypted media data to a multicast address. By contrast, in some cases, it is difficult to keep each of the terminals 200 in a state available to receive media data, so that a media receivable mode has to be activated when multicast data communication is started, and to be canceled when the multicast data communication is finished.

In the following description, a sequence of starting secure multicast data communication in such case is explained below with reference to FIG. 16.

To begin with, in one of the terminals 200 that starts a media data transmission (hereinafter, "the sender terminal 200*d*"), the transmitting unit 221 notifies the start of the media data transmission to the presence server 100 by transmitting a SIP PUBLISH REQUEST message that includes information of a multicast group within which the transmission is started (step S1601). The SIP PUBLISH REQUEST message is created by the publication-message processing unit 201.

Next, the receiving unit 122 of the presence server 100 receives the SIP PUBLISH REQUEST message (step S1602). The authenticating unit 112 then authenticates the sender terminal 200*d* based on authentication information included in the SIP PUBLISH REQUEST message (step S1603). In this case, the authenticating unit 112 authenticates whether the sender terminal 200*d* is available to communicate with the multicast group subjected to the transmission. Alternatively, it can be configured not to perform authentication. Furthermore, it can be configured to use such as an external authenticating server.

If the sender terminal 200*d* is authenticated, the notification-message processing unit 103 creates a SIP NOTIFY REQUEST message that includes a corresponding multicast address information to notify that the media data transmission is to be started (step S1604).

When creating the SIP NOTIFY REQUEST message, the notification-message processing unit 103 acquires the multicast address of the multicast group from the address table 145. In addition, the notification-message processing unit 103 acquires URIs of the terminals that form the multicast group (hereinafter, "the receiver terminals 200") from the correspondence table 143 with reference to information of the multicast group included in the received SIP PUBLISH REQUEST message. The SIP PUBLISH REQUEST message can also include information about the sender, and information about ID of the key in use.

The notification-message processing unit 103 then transmits the created SIP NOTIFY REQUEST message to the receiver terminals 200 (step S1605).

The receiving unit 222 of each of the receiver terminals 200 receives the SIP NOTIFY REQUEST message (step S1606), and acquires the information of the multicast group within which the transmission of media is to be started from the received SIP PUBLISH REQUEST message.

The notification-message processing unit 203 then activates the media data receivable mode (step S1607). Specifically, the notification-message processing unit 203 specifies the multicast group within which the transmission of media is to be started based on the acquired multicast group information, and notifies the receiving unit 222 to prepare to receive data directed to the multicast group. When activating the media data receivable mode, the receiver terminals 200 can be set into a state available to receive media data from the multicast address included in the received multicast group information by using the multicast address and key information including the ID of the key.

Network setting for IP multicast is performed by each of the terminals 200 according to a method similar to conventional methods using such as the Internet group management protocol (IGMP).

Next, the notification-message processing unit 203 creates a SIP NOTIFY RESPONSE message (step S1608). The created message is transmitted by the transmitting unit 221 to the presence server 100 (step S1609).

Next, the receiving unit 122 of the presence server 100 receives the SIP NOTIFY RESPONSE message (step S1610).

Subsequently, the notification-message processing unit 103 of the presence server 100 creates a SIP PUBLISH RESPONSE message (step S1611), and the transmitting unit 121 transmits the created message to the sender terminal 200*d* (step S1612).

The SIP PUBLISH RESPONSE message is transmitted after the SIP NOTIFY RESPONSE message is received from all of the receiver terminals 200 in the multicast group. Alternatively, the SIP PUBLISH RESPONSE message can also be transmitted just after the SIP NOTIFY REQUEST message is received from the sender terminal 200*d*.

Furthermore, to avoid data transmissions performed by a plurality of sender terminals 200 to the same multicast group, the presence server 100 can be configured to store information of the sender terminal 200*d* that is currently transmitting media data, for example, into the presentity information table 141.

In other words, the presence server 100 can be configured such that if the sender terminal 200*d* is permitted to transmit data to the multicast group, any other sender terminal is not permitted to transmit data to the multicast group. As a result, the presence server 100 can exclusively permit the sender terminal 200*d* to transmit data to the multicast group.

Next, the receiving unit 222 of the sender terminal 200*d* receives the SIP PUBLISH RESPONSE message (step S1613). After receiving the SIP PUBLISH RESPONSE message, the sender terminal 200*d* can transmits actual media data.

Precisely, the transmitting unit 221 of the sender terminal 200*d* transmits media data (step S1614), and the receiving unit 222 of the receiver terminals 200 receives the media data (step S1615).

Thus, a transmission of media data can be appropriately started without keeping the media data receivable mode permanently.

Figure 17:
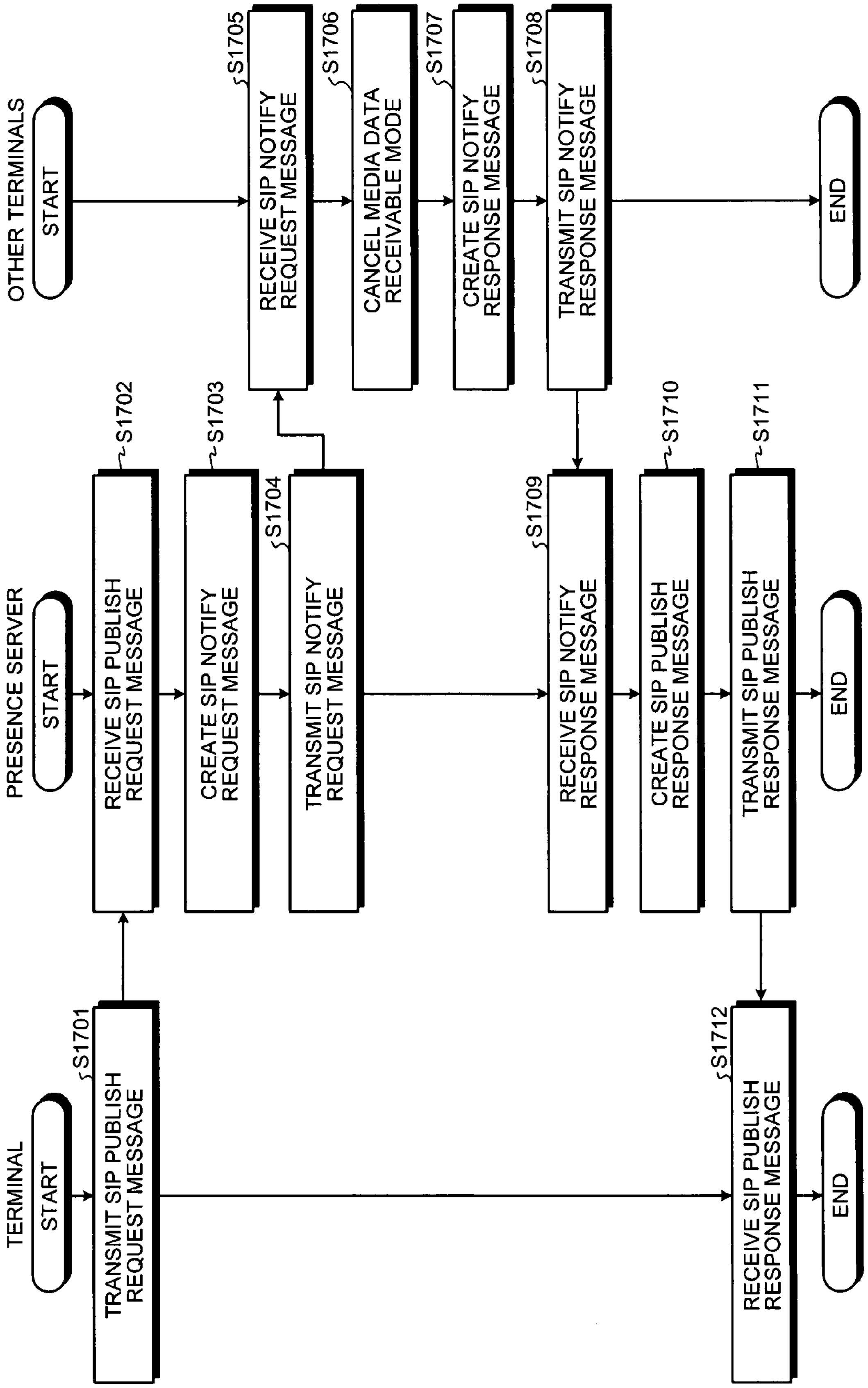
FIG. 17 is a flowchart of an ending processing of the data communication according to the first embodiment.

Next, a sequence of ending the secure multicast data communication that is started as described above is explained below with reference to FIG. 17.

When the media data transmission is finished, the sender terminal 200*d* transmits a SIP PUBLISH REQUEST message for notifying that the media data transmission is finished to the presence server 100 (step S1701).

Next, the receiving unit 122 of the presence server 100 receives the SIP PUBLISH REQUEST message (step S1702). If the presence server 100 keeps information of the sender terminal 200*d* that is currently transmitting media data in such as the presentity information table 141 for exclusive control, the presence server 100 can be configured to delete such information.

Next, the notification-message processing unit 103 creates a SIP NOTIFY REQUEST message that includes a corresponding multicast address information to notify that the media data transmission is terminated (step S1703).

When creating the SIP NOTIFY REQUEST message, the notification-message processing unit 103 acquires the multicast address of the multicast group from the address table 145. In addition, the notification-message processing unit 103 acquires the URIs of the receiver terminals 200 from the correspondence table 143 with reference to information of the multicast group included in the received SIP PUBLISH REQUEST message.

The notification-message processing unit 103 then transmits the created SIP NOTIFY REQUEST message to the receiver terminals 200 (step S1704).

The receiving unit 222 of each of the receiver terminals 200 receives the SIP NOTIFY REQUEST message (step S1705), and acquires the information of the multicast group within which the transmission of media is terminated from the received SIP PUBLISH REQUEST message.

The notification-message processing unit 203 then cancels the media data receivable mode (step S1706). Specifically, the notification-message processing unit 203 sets the receiver terminals 200 into a state unavailable to receive media data from the multicast address included in the acquired multicast group information.

Network setting for IP multicast is performed by each of the terminals 200 according to a method similar to conventional methods using such as the Internet group management protocol (IGMP).

Figure 16:
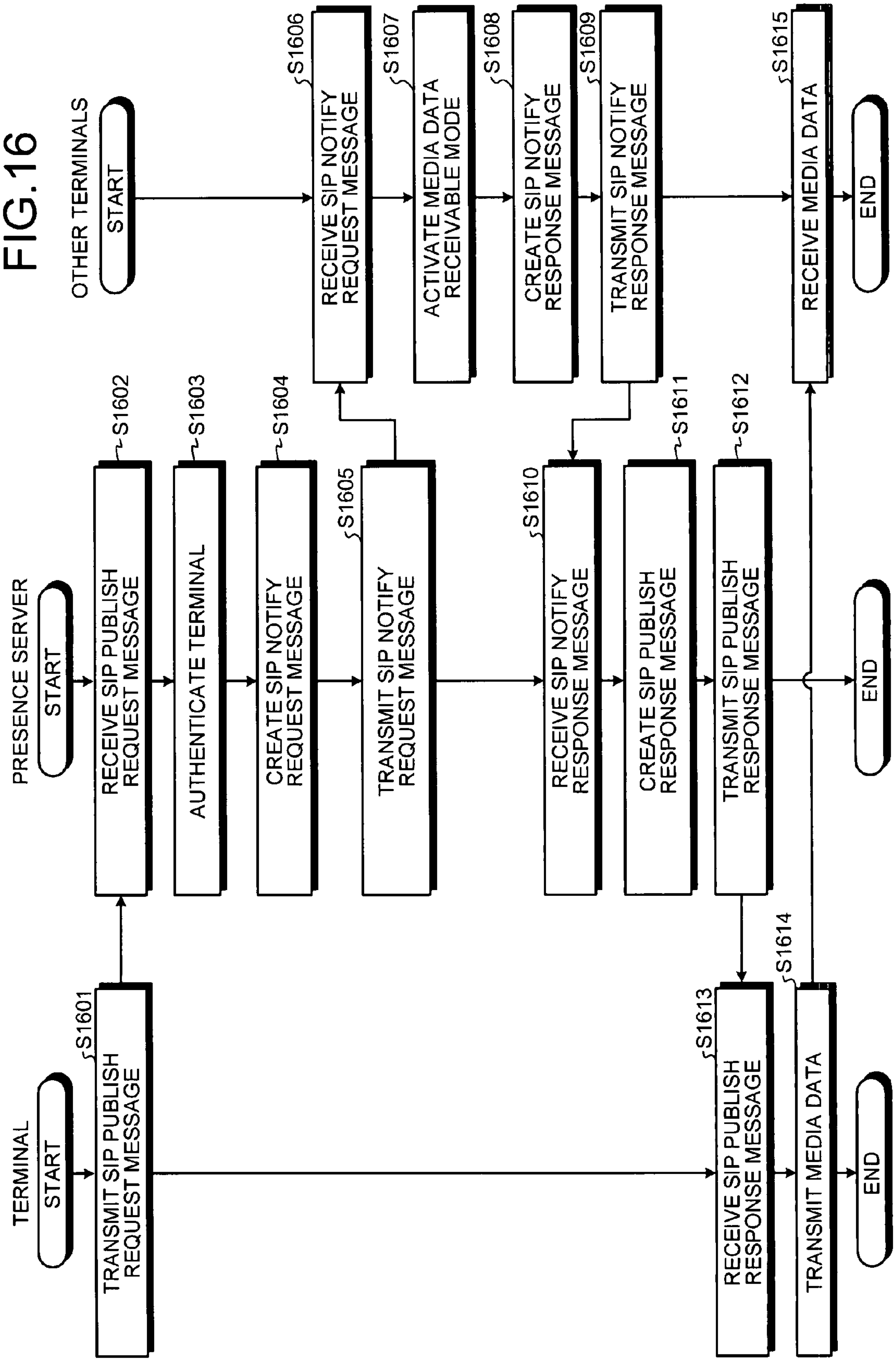
FIG. 16 is a flowchart of a starting processing of data communication according to the first embodiment.

Explanations for transmitting-receiving processing of the SIP NOTIFY RESPONSE message and transmitting-receiving processing of the SIP PUBLISH RESPONSE message at steps S1707 to S1712 are omitted, because these transmissions are similar to the processing at steps S1608 to S1613 shown in FIG. 16.

Thus, the termination of the transmission of media data can be notified appropriately, so that the media data receivable mode does not need to be kept permanently. The above description explains the example where the terminal 200*d* is the sender terminal, however, any terminal in the multicast group can be a sender terminal.

Next, difference between key distribution sequences of the embodiment according to the present invention and a comparative conventional technology is explained below with reference to FIGS. 18 and 19.

Figure 18:
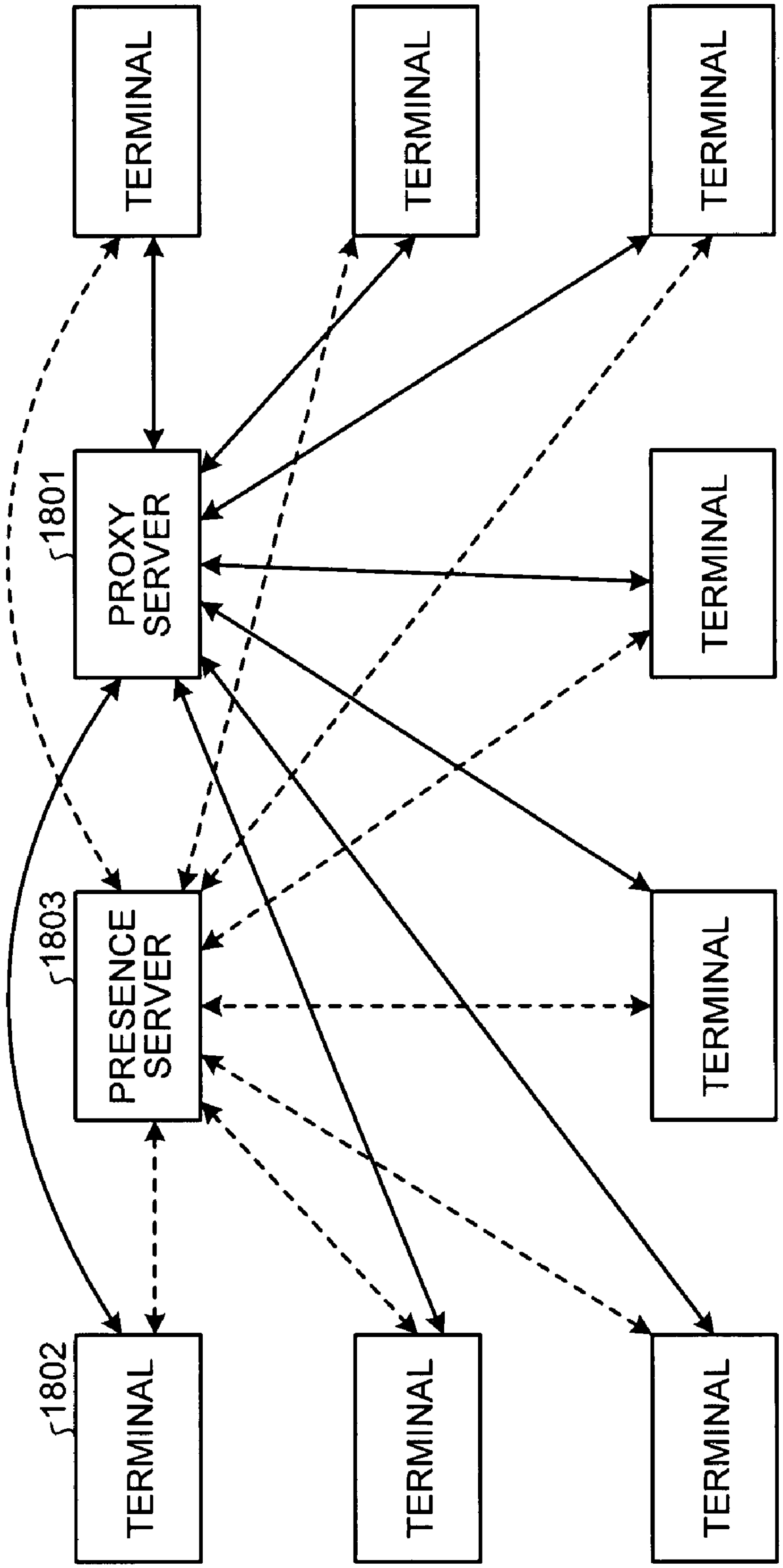
FIG. 18 is a schematic for explaining a communication system that includes a presence server according to a conventional technology.

As shown in FIG. 18, a conventional communication system includes a proxy server 1801, terminals 1802, and a presence server 1803 similarly to the first embodiment. However, the conventional communication system needs to perform the key exchange between each of the terminals via the proxy server 1801.

Figure 19:
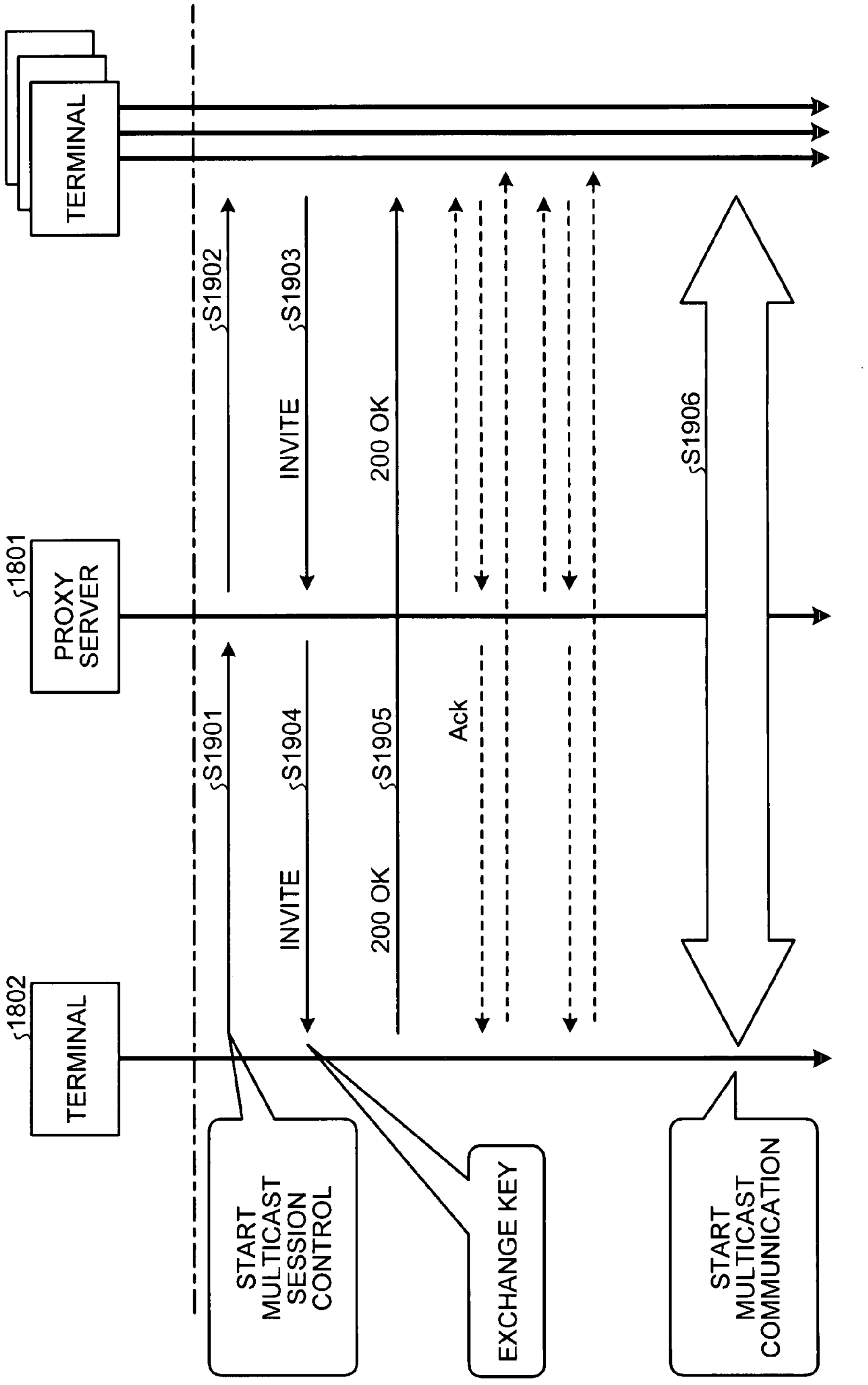
FIG. 19 is a sequence chart of a key exchange process performed by the conventional communication system shown in FIG. 18.

In a sequence shown in FIG. 19, one of the terminals 1802 that desires secure IP multicast communication transmits an INVITE-Request (step S1901). Membership information of an IP multicast group can be specified by the terminal 1802, or can be kept in the proxy server 1801.

The proxy server 1801 that receives the INVITE-Request forks the message, and copies and transfers the INVITE-Request to terminals of the all members that form the IP multicast group (step S1902) when the membership information is kept in the proxy server 1801.

The terminal 1802 that desires the IP multicast communication and the member terminals that form the IP multicast group exchange an INVITE-Response (200 OK) according to the offer-answer model (steps S1903 and S1904), and a message of acknowledgement (ACK) (step S1905).

Thus, the terminal 1802 that desires the IP multicast communication exchanges an encryption key for encrypting a multicast message with all of the group member terminals. After the key exchange process is completed, the secure IP multicast communication is executed (step S1906).

According to the conventional method, an IP multicast communication is started after the key exchange is completed between all members, thereby resulting in an excessive time cost until the start of communication in some cases.

The presence server 1803 according to the conventional technology only notifies terminals of various presence information, and is irrelevant to the key exchange for an IP multicast communication by the SIP-based system.

Figure 20:
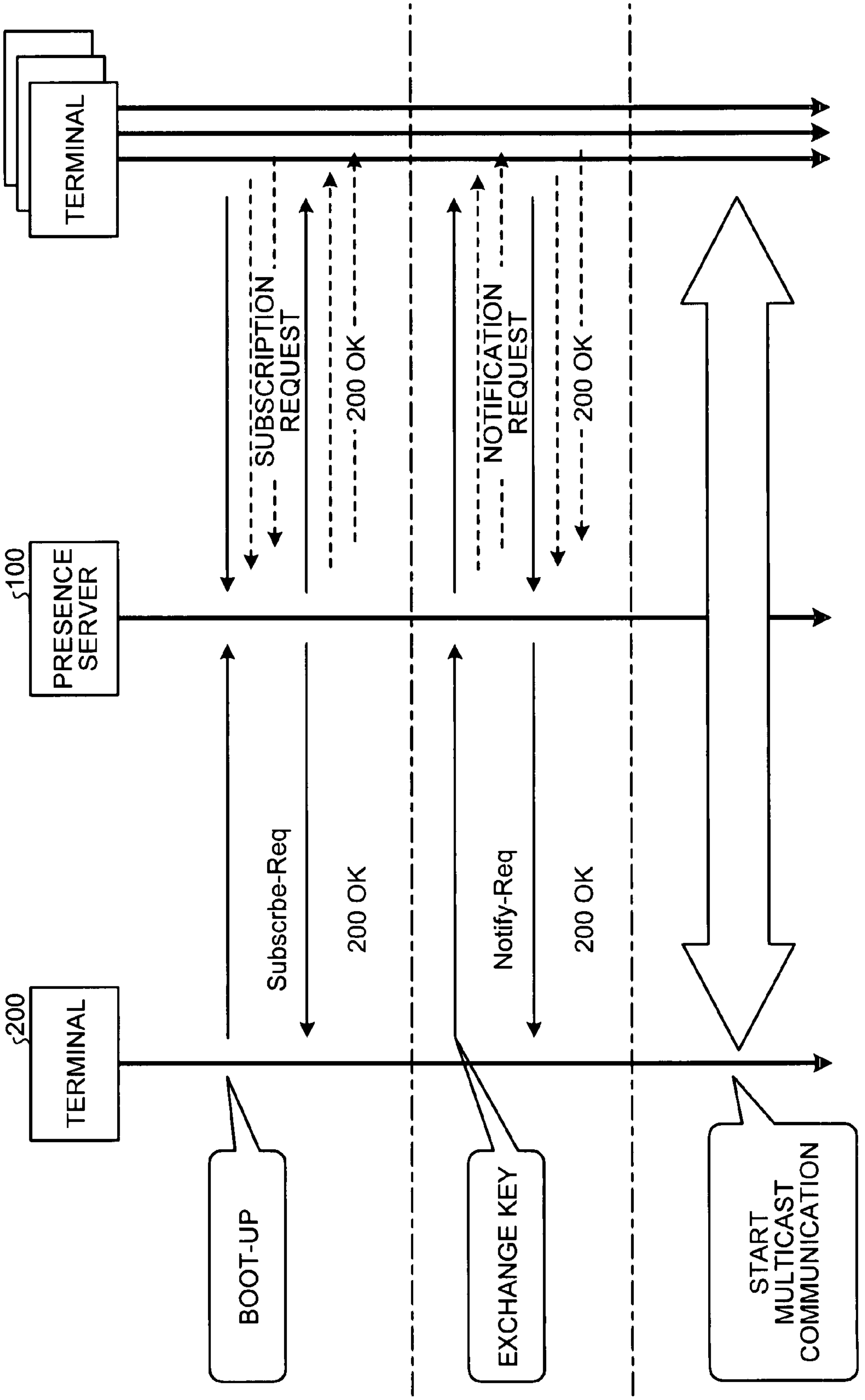
FIG. 20 is a sequence chart of a key exchange process performed by the communication system shown in FIG. 1.

As shown in FIG. 20, according to the first embodiment, the key exchange process can be performed by the presence server 100 instead of with all multicast group member terminals, although details are omitted because they are as described above. Moreover, when one of the terminals 200, for example, the terminal 200*b*, boots up, the terminal 200*b* can acquire key information registered in advance from the presence server 100 by using such as a SIP SUBSCRIBE REQUEST message and a SIP NOTIFY REQUEST message, so that the terminal 200*b* does not need to exchange key information mutually with others of the terminals 200.

Thus, the server apparatus according to the first embodiment can exchange a key for an IP multicast communication in advance by using a function of the presence server. Moreover, the server apparatus can integrate a message transmission for the key exchange protocol and a message transmission for transmitting presence information, thereby reducing network traffic and a time cost required until secure IP multicast communication is started by a SIP-based system.

Conventionally, a nonmember terminal is not permitted to transmit data to a group that performs secure IP multicast communication. Therefore, such nonmember terminal needs to join the multicast group temporarily to perform such data transmission.

A server apparatus according to a second embodiment of the present invention transmits a temporarily available encryption key to a terminal that desires a data transmission to a secure multicast group. Because of the temporarily available encryption key, a nonmember terminal can achieve secure IP multicast communication without particular processing, for example, processing for joining the multicast group.

Figure 21:
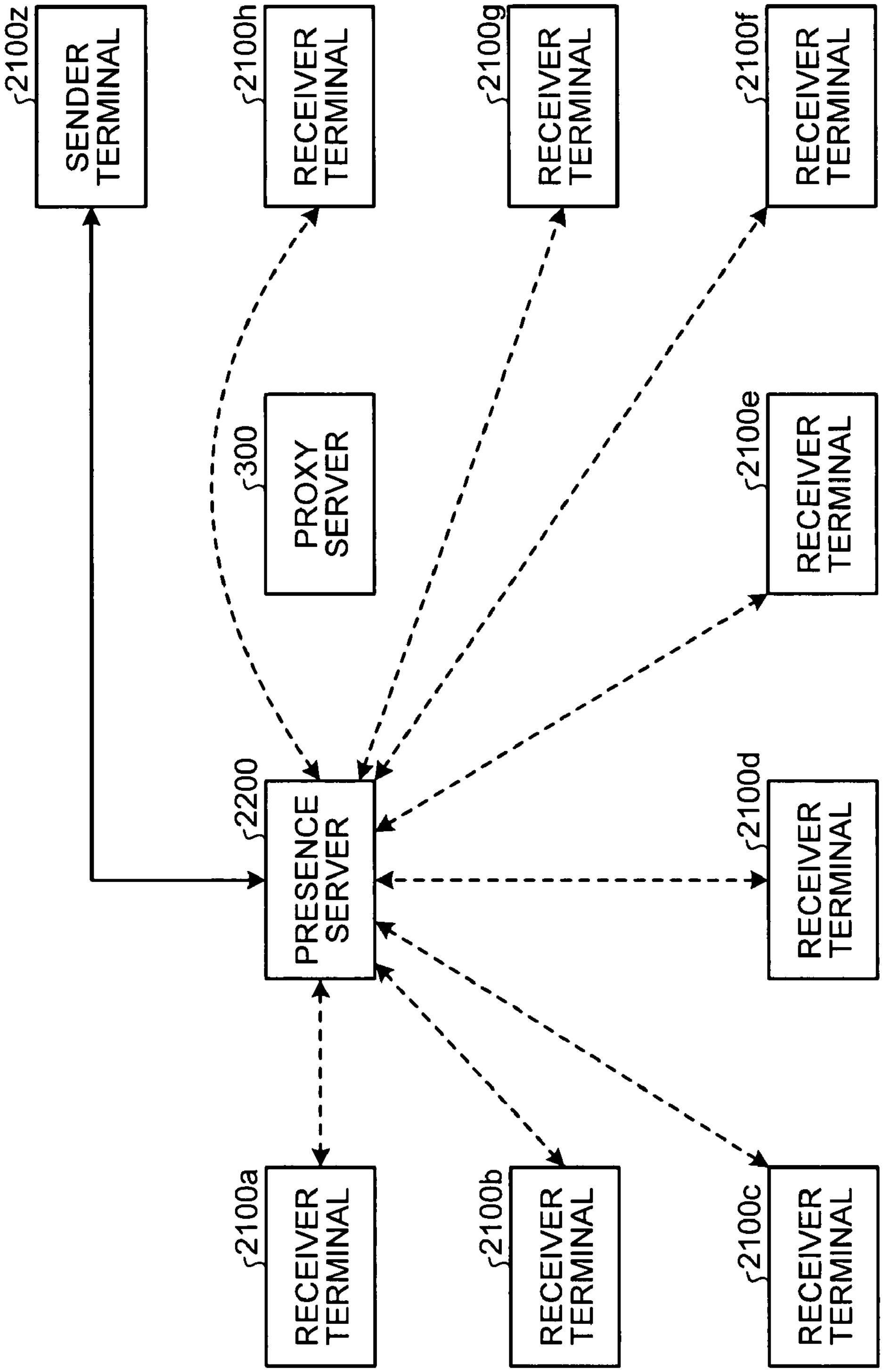
FIG. 21 is a schematic for explaining a communication system according to a second embodiment of the present invention.

As shown in FIG. 21, a communication system that includes a presence server 2300, which is the server apparatus according to the second embodiment, differs from the communication system according to the first embodiment shown in FIG. 1 in including a sender terminal 2100*z* that desires to transmit media data to a multicast group, but does not belong the multicast group.

Receiver terminals 2100*a* to 2100*h* differ from the sender terminal 2100*z* in belonging to the same multicast group. Hereinafter, the receiver terminals 2100*a* to 2100*h* are simply referred to as the receiver terminals 2100.

Figure 22:
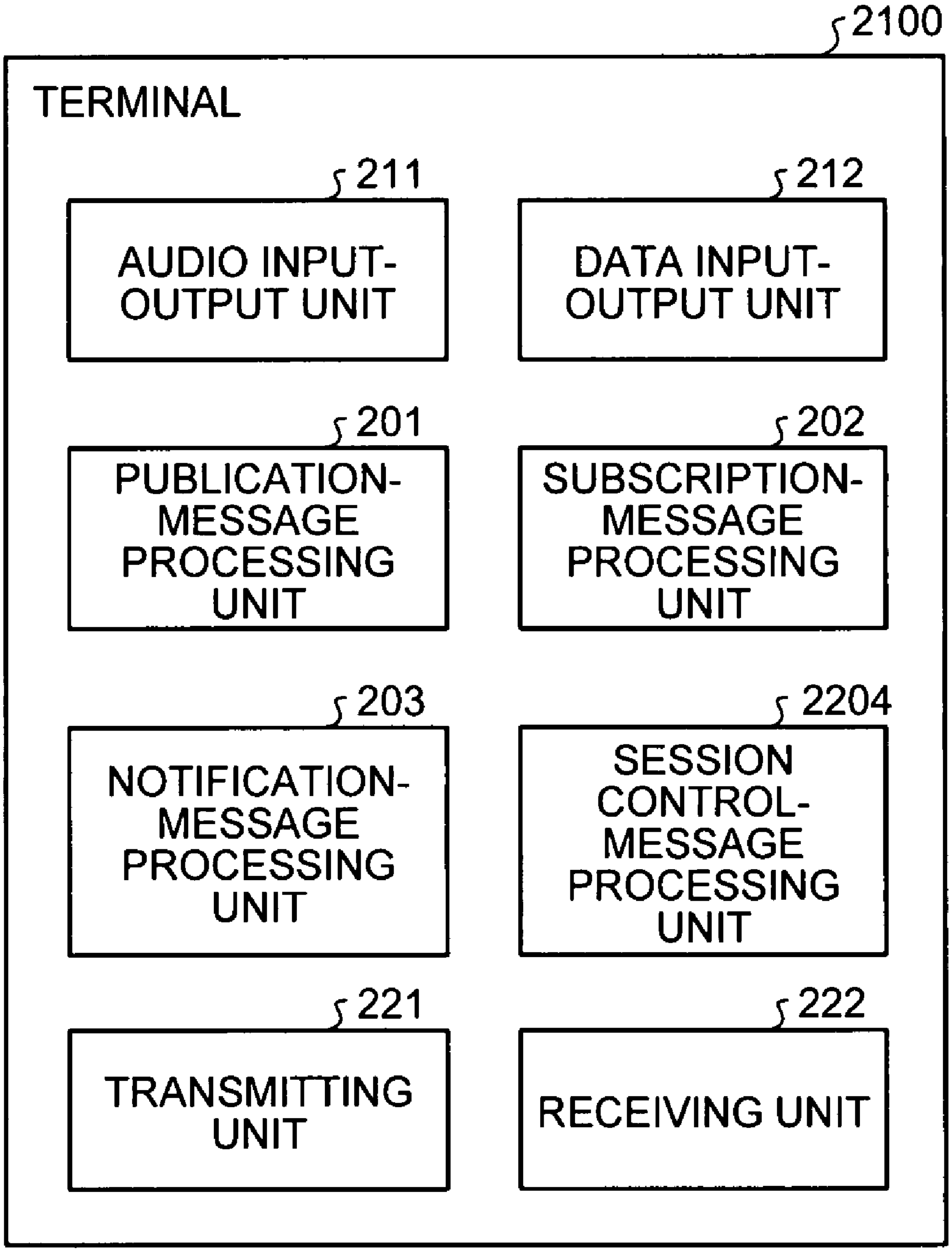
FIG. 22 is a block diagram of a terminal shown in FIG. 21.

As shown in FIG. 22, each of the receiver terminals 2100 and the sender terminal 2100*z* include the audio input-output unit 211, the data input-output unit 212, the publication-message processing unit 201, the subscription-message processing unit 202, the notification-message processing unit 203, a session control-message processing unit 2204, the transmitting unit 221, and the receiving unit 222.

The second embodiment differs from the first embodiment in adding the session control-message processing unit 2204. The other configurations and functions are similar to FIG. 2, therefore, the rest of the units are assigned with the same reference numerals as in FIG. 2, and explanations are omitted here.

The session control-message processing unit 2204 performs processing related to a session control request message received from the presence server 2300. Specifically, the session control-message processing unit 2204 acquires and processes key information included in the session control request message, and creates an ACK message, which is a response to the session control request message.

Figure 23:
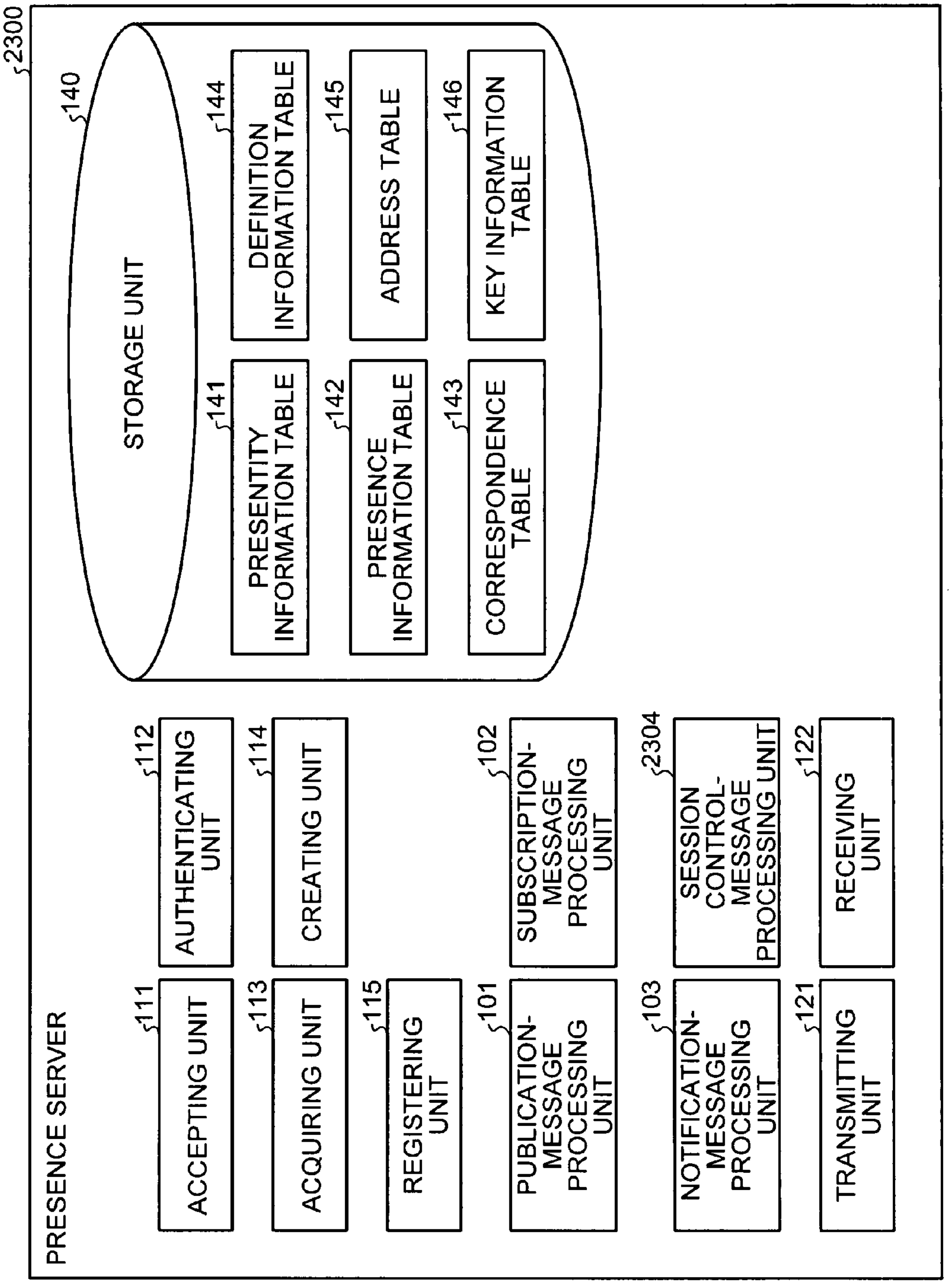
FIG. 23 is a block diagram of a server apparatus shown in FIG. 21.

As shown in FIG. 23, the presence server 2300 includes the storage unit 140, the accepting unit 111, the authenticating unit 112, the acquiring unit 113, the creating unit 114, the registering unit 115, the publication-message processing unit 101, the subscription-message processing unit 102, the notification-message processing unit 103, a session control-message processing unit 2304, the transmitting unit 121, and the receiving unit 122.

The second embodiment differs from the first embodiment in adding the session control-message processing unit 2304. The other configurations and functions are similar to FIG. 3, therefore, the rest of the units are assigned with the same reference numerals as in FIG. 3, and explanations are omitted here.

The session control-message processing unit 2304 processes a session control request message, which requests the start of multicast communication to a multicast group controlled by the presence server 2300. The session control-message processing unit 2304 can use, for example, a SIP INVITE message, as a session control request message. The form of session control request message is not limited to this, but any form of message that can request the start of multicast communication can be used.

Figure 24:
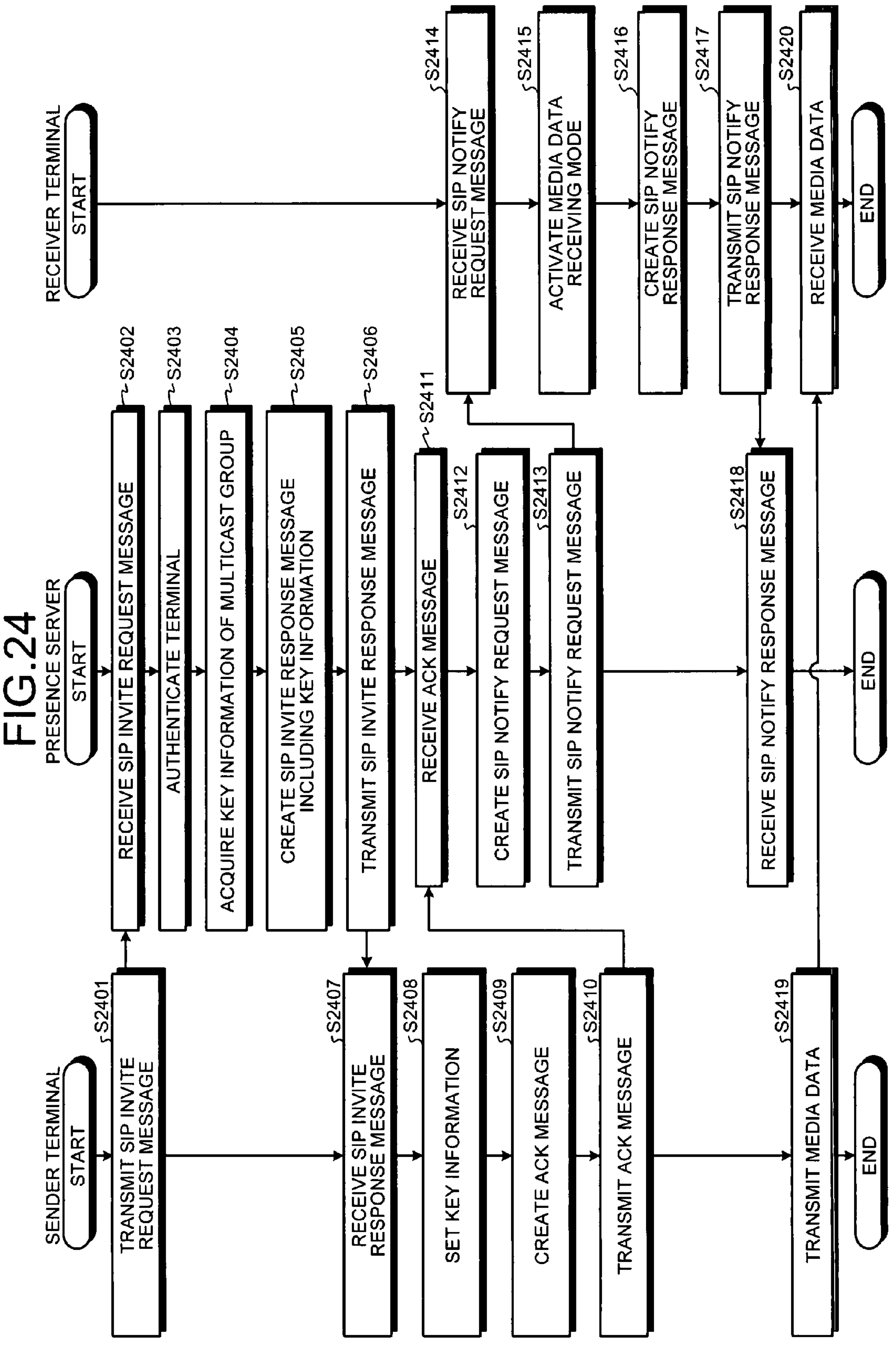
FIG. 24 is a flowchart of a key exchange process according to the second embodiment.

Next, a session control request and key exchange process performed by the presence server 2300 is explained below with reference to FIG. 24.

To begin with, the transmitting unit 221 of the sender terminal 2100*z* transmits a SIP INVITE REQUEST message that includes a URI to identify a multicast group with which the sender terminal 2100*z* intends to communicate and the ID information of the sender terminal 2100*z* to the presence server 2300 (step S2401). The SIP INVITE REQUEST message is created by the session control-message processing unit 2204.

Next, the receiving unit 122 of the presence server 2300 receives the SIP INVITE REQUEST message (step S2402).

Next, the authenticating unit 112 confirms authentication of a data transmission to the multicast group by the sender terminal 2100*z* (step S2403). The presence server 2300 can be configured to use an external authenticating server when confirming the authentication of the data transmission.

If the data transmission by the sender terminal 2100*z* is authenticated, the acquiring unit 113 acquires key information corresponding to the multicast group from the key information table 146 by using the URI of the multicast group included in the SIP INVITE REQUEST message (step S2404). In addition, the acquiring unit 113 acquires a multicast address corresponding to the URI from the address table 145.

The session control-message processing unit 2304 then creates a SIP INVITE RESPONSE message that includes the acquired key information (step S2405). Specifically, the session control-message processing unit 2304 creates the SIP INVITE RESPONSE message that includes multicast group information including the multicast address information and the key information.

The session control-message processing unit 2304 can be configured to encrypt the multicast group information including the key information when creating the SIP INVITE RESPONSE message. For example, the session control-message processing unit 2304 can be configured to create a message that includes key information encrypted according to MIKEY.

Next, the transmitting unit 121 transmits the created SIP INVITE RESPONSE message to the sender terminal 2100*z* (step S2406).

To avoid data transmissions performed by a plurality of sender terminals to the same multicast group, the presence server 2300 can be configured to store information of the sender terminal 2100*z* that is currently keeping the key information, for example, into the presentity information table 141.

In other words, the presence server 2300 can be configured such that if the sender terminal 2100*z* is permitted to transmit data to the multicast group, any other sender terminal is not permitted to transmit data to the multicast group. As a result, the presence server 2300 can exclusively permit the sender terminal 2100*z* to transmit data to the multicast group.

Next, the receiving unit 222 of the sender terminal 2100*z* receives the SIP INVITE RESPONSE message (step S2407). The session control-message processing unit 2204 then sets the key information included in the received SIP INVITE RESPONSE message (step S2408).

The session control-message processing unit 2204 then creates an ACK message (step S2409), and the transmitting unit 221 transmits the created ACK message to the presence server 2300 (step S2410). Next, the receiving unit 122 of the presence server 2300 receives the ACK message (step S2411).

The session control-message processing unit 2204 can be configured to create the ACK message that includes data defined in the protocol used for the key exchange, such as MIKEY. For example, ID information of the sender terminal 2100*z* for performing mutual authentication between the sender terminal 2100*z* and the presence server 2300 can be included.

Moreover, the presence server 2300 can transmit the SIP NOTIFY REQUEST message to the receiver terminals 2100 with the notification-message processing unit 103, and notify that the multicast data transmission is started, or information of the sender terminal 2100*z* and information of the timing in relation to the multicast data transmission (steps S2412 and S2413).

In response to this, the receiver terminals 2100 can be configured to acquire information such as the timing of the multicast data transmission to be started from information included in the received SIP NOTIFY REQUEST message with the notification-message processing unit 203, and to activate a media receiving mode (steps S2414 and S2415).

Detailed explanations for steps S2412 to S2418 that describe these processing are omitted, because those steps are similar to steps S1604 to S1610 shown in FIG. 16.

After that, the sender terminal 2100*z* can transmit media data. Precisely, the transmitting unit 221 transmits media data (step S2419), and the receiving unit 222 of the receiver terminals 2100 receives the transmitted media data (step S2420). The receiver terminals 2100 decodes the media data by using the corresponding encryption key, and executes subsequent processing.

Figure 25:
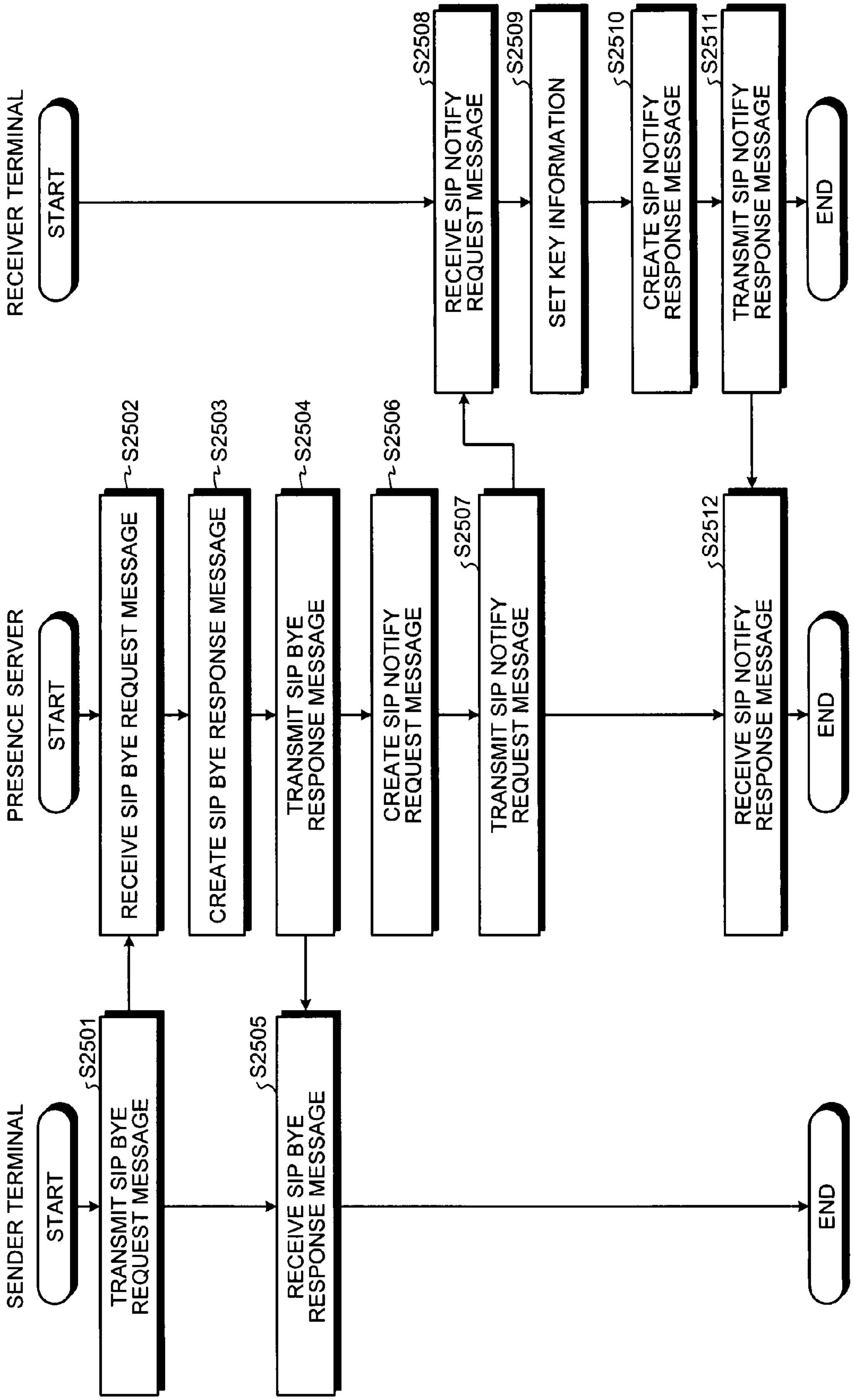
FIG. 25 is a flowchart of an ending processing of the data communication according to the second embodiment.

Next, a sequence of ending the secure multicast data communication that is started after exchanging the key at the processing shown in FIG. 16 is explained below with reference to FIG. 25.

To begin with, when the media data transmission is finished, the sender terminal 2100*z* transmits a BYE REQUEST message for notifying that the media data transmission is finished to the presence server 2300 (step S2501). The BYE REQUEST message is created by the session control-message processing unit 2204.

Next, the receiving unit 122 of the presence server 2300 receives the BYE REQUEST message (step S2502). If the information of the sender terminal 2100*z* is kept in such as the presentity information table 141 for exclusive control, the information can be deleted.

Next, the session control-message processing unit 2304 creates a SIP BYE RESPONSE message (step S2503), and the transmitting unit 121 transmits the created message to the sender terminal 2100*z* (step S2504). The receiving unit 222 of the sender terminal 2100*z* then receives the SIP BYE RESPONSE message (step S2505).

The presence server 2300 newly creates or renews the key of the corresponding multicast group and store the new key in the key information table 146, and exchanges the key with each of the receiver terminals 2100 included in a list of the corresponding multicast group at timing as desired afterward.

Precisely, the notification-message processing unit 103 of the presence server 2300 creates a SIP NOTIFY REQUEST message for notifying information such as presence information to the receiver terminals 2100 (step S2506).

At this moment, the notification-message processing unit 103 creates a SIP NOTIFY REQUEST message that includes the multicast group information including the new key information. The notification-message processing unit 103 can encrypt the multicast group information, and can put information indicating that the multicast data transmission is finished into the SIP NOTIFY REQUEST message.

Next, the transmitting unit 121 transmits the created SIP NOTIFY REQUEST messages to the receiver terminals 2100 (step S2507).

Alternatively, the transmitting unit 121 can be configured to combine the SIP NOTIFY REQUEST messages into a single SIP NOTIFY REQUEST message, and to transmit it.

The transmission of the SIP NOTIFY REQUEST message does not need to be performed as soon as the SIP BYE RESPONSE message is processed. For example, the presence server 2300 can be configured to transmit the SIP NOTIFY REQUEST message simultaneously with a transmission of another SIP NOTIFY REQUEST message in response to a renewal of presentity information, multicast group information, or group definition information.

The receiving unit 222 of the receiver terminals 2100 receives the SIP NOTIFY REQUEST message (step S2508). The notification-message processing unit 203 then sets the key information and the multicast address information included in the received SIP NOTIFY REQUEST message (step S2509).

If the received SIP NOTIFY REQUEST message includes information indicating that the multicast data transmission is finished, the media receiving mode can be canceled.

Next, the notification-message processing unit 203 creates a SIP NOTIFY RESPONSE message, which is a response to the SIP NOTIFY REQUEST message (step S2510).

Subsequently, the transmitting unit 221 transmits the created SIP NOTIFY RESPONSE message to the presence server 2300 (step S2511). The receiving unit 122 of the presence server 2300 receives the SIP NOTIFY RESPONSE message (step S2512), and then the data transmission is terminated.

The processing at steps S2507 to S2512 is executed with all of the receiver terminals 2100 included in the multicast group within which the transmission is terminated. As described previously, these processing do not need to be simultaneously performed by all of the receiver terminals 2100.

Thus, if the server apparatus according to the second embodiment receives a request of an IP multicast transmission from a terminal that does not belongs to the multicast group, the server apparatus can reply the key information used for the IP multicast transmission. Due to this, secure IP multicast communication can be achieved without particular processing such that the terminal that does not belongs to the multicast group needs to join the multicast group. When the secure IP multicast is finished, the server apparatus can change the key information for the multicast group to avoid the continuous access to the multicast group by the previous sender terminal.

The present invention is not limited to the first and second embodiments, but can be implemented in various modifications as described below.

In the first and second embodiments, the system is configured such that the presence server includes all functions required for key exchange process. However, the system can be configured such that a terminal executes part of the functions.

For example, the system can be configured to include terminals that includes part or all of the tables present in the storage unit 140, namely, the presentity information table 141, the presence information table 142, the correspondence table 143, the definition information table 144, the address table 145, and the key information table 146; and a presence server that does not include the table(s) included in the terminals.

In this case, if a change in information present in one of the terminals arises, the terminal transmits and receives information to and from the presence server with such as a SIP PUBLISH message so that the change is notified. Thus, the functions similar to the above embodiments can be achieved by transmitting-receiving relevant information with predetermined messages.

Figure 26:
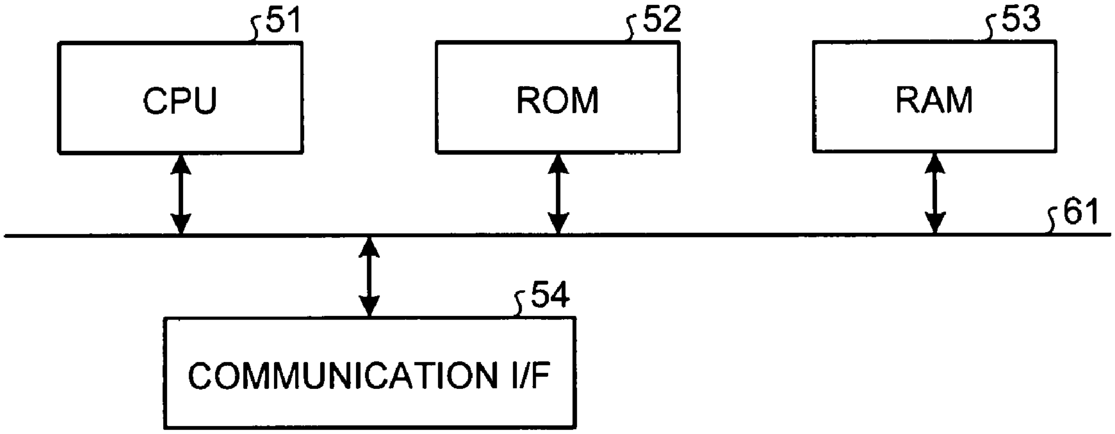
FIG. 26 depicts hardware configuration of the server apparatus according to the embodiments of the present invention.

Next, hardware configuration of the server computer according to the first or second embodiment is explained below with reference to FIG. 26.

The server apparatus according to the first or second embodiment includes a control device such as a central processing unit (CPU) 51, a storage device such as a read-only memory (ROM) 52 and a RAM 53, an external storage device such as a HDD, a compact disc (CD) drive, a display device, an input device such as a keyboard and a mouse, and a bus 61 that connects between each unit, and has hardware configuration using a normal computer.

A communication program to be executed on the server apparatus is provided in a file in a installable format or in a executable format recorded onto a computer-readable recording medium, such as a compact disk read only memory (CD-ROM), a flexible disk (FD), a compact disk recordable (CD-R), and a digital versatile disk (DVD).

The communication program can be provided in such a way that a computer connected to a network such as the Internet stores therein the communication program, and the server apparatus downloads it via the network. Alternatively, the communication program can be provided or distributed via a network such as the internet.

Moreover, the communication program can be provided by incorporating it into such as the ROM in advance.

The communication program has module configuration that includes each unit described above (the accepting unit, the authenticating unit, the acquiring unit, the creating unit, the registering unit, the publication-message processing unit, the subscription-message processing unit, the notification-message processing unit, the transmitting unit, and the receiving unit). Practical hardware including each of the units is created on the main storage device as the CPU (processor) 51 reads out the communication program from the recording medium, and executes the program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus for managing an encryption key used for multicast communication between a plurality of terminals, the server apparatus comprising:

a first storage unit configured to store therein presence information including a communication state of the terminals;

a second storage unit configured to store therein in associated manner a terminal identifier unique to each of the terminals and an encryption key to be used for multicast communication within a multicast group to which each of the terminals belongs;

a receiving unit configured to receive a subscription request message from a first terminal from among the terminals, the subscription request message including a first terminal identifier unique to the first terminal and a request requesting subscription to presence information stored in the first storage unit;

an acquiring unit configured to acquire a first encryption key to be used for multicast communication within a first multicast group to which the first terminal belongs from the second storage unit by using the first terminal identifier; and a transmitting unit configured to transmit an acquired first encryption key to the first terminal together with the presence information requested for subscription.

2. The apparatus according to claim 1, wherein the second storage unit is configured to store therein in associated manner the terminal identifier, the encryption key, and a multicast address to be used for multicast communication within the multicast group, the acquiring unit is configured to acquire a multicast address to be used for multicast communication within the first multicast group from the second storage unit together with the first encryption key, and the transmitting unit is configured to transmit acquired multicast address to the first terminal together with the first encryption key.

3. The apparatus according to claim 1, further comprising a third storage unit configured to store therein in associated manner group definition information in which a group identifier unique to the multicast group and predetermined conditions relating to presence information, wherein the second storage unit is configured to store therein in associated manner the group identifier and an encryption key to be used for multicast communication within the multicast group, the receiving unit is configured to receive an information notification message from a second terminal from among the terminals, the information notification message including presence information of the second terminal, the acquiring unit is configured to acquire a first group identifier corresponding to conditions satisfied by the presence information of the second terminal from the third storage unit, and acquires an encryption key corresponding to the first group identifier from the second storage unit, the transmitting unit is configured to transmit acquired encryption key to at least one of the second terminal and terminals included in a multicast group identified with the first group identifier.

4. The apparatus according to claim 1, further comprising:

a creating unit configured to create an encryption key of a multicast group; and a registering unit configured to register created encryption key into the second storage unit, wherein when the registering unit registers the encryption key in the second storage unit, the transmitting unit transmits registered key to the terminals included in the multicast group.

5. The apparatus according to claim 1, further comprising:

a third storage unit configured to store therein group definition information in which a group identifier unique to the multicast group is associated with predetermined conditions relating to presence information;

an accepting unit configured to accept input of the group definition information; and a registering unit configured to register accepted group definition information into the third storage unit, wherein the second storage unit is configured to store therein in associated manner the group identifier and an encryption key to be used for multicast communication within the multicast group, when the registering unit registers the group definition information in the third storage unit, the acquiring unit acquires an encryption key corresponding to the group identifier included in registered group definition information from the second storage unit, and the transmitting unit is configured to transmit acquired encryption key to the terminals that have presence information satisfying the conditions of the registered group definition information.

6. The apparatus according to claim 5, wherein the receiving unit is configured to receive a registration request message that includes the group definition information and a request requesting registration of the group definition information, the registering unit is configured to register the group definition information included in received registration request message into the third storage unit.

7. The apparatus according to claim 6, further comprising an authenticating unit configured to authenticate a third terminal from among the terminals that transmits the registration request message, wherein when the authenticating unit authenticates the third terminal, the registering unit registers the group definition information included in the registration request message into the third storage unit.

8. The apparatus according to claim 1, wherein the further comprising a registering unit configured to register an encryption key into the second storage unit, the encryption key having been received by the receiving unit from a second terminal from among the terminals.

9. The apparatus according to claim 8, further comprising an authenticating unit configured to authenticate the second terminal, wherein when the authenticating unit authenticates the fourth terminal, the registering unit registers received encryption key into the second storage unit.

10. The apparatus according to claim 1, wherein the receiving unit is configured to receive a starting message that notifies start of multicast communication from a second terminal from among the terminals, and when the receiving unit receives the starting message, the transmitting unit transmits a starting request message to request start of the multicast communication to receiver terminals from among the terminals included in a multicast group that are targets for the multicast communication.

11. The apparatus according to claim 10, wherein the receiving unit is configured to receive an ending message that notifies end of the multicast communication from the second terminal, and when the receiving unit receives the ending message, the transmitting unit transmits an ending request message to request end of the multicast communication to the receiver terminals.

12. The apparatus according to claim 10, wherein if no terminal other than the fifth terminal is currently performing multicast communication, the transmitting unit is configured to transmit a permission message to permit the multicast communication to the second terminal.

13. The apparatus according to claim 1, further comprising an authenticating unit configured to authenticate a terminal from among the terminals, wherein the receiving unit is configured to receive a communication request message that requests multicast communication to a second multicast group from a second terminal from among the terminals that is not included in the second multicast group, the communication request message including a second group identifier unique to the second multicast group, the authenticating unit is configured to authenticate the second terminal, when the authenticating unit authenticates the sixth terminal, the acquiring unit acquires an encryption key corresponding to the second group identifier from the second storage unit, the transmitting unit is configured to transmit acquired encryption key to the second terminal.

14. The apparatus according to claim 13, wherein if no terminal other than the second terminal is currently performing multicast communication, the transmitting unit is configured to transmit a permission message to permit the multicast communication to the second terminal.

15. A terminal that is connectable via a network to a server apparatus having a first storage unit and a second storage unit for managing presence information and included in a multicast group as a target for performing multicast communication, the terminal comprising:

a transmitting unit configured to transmit a subscription request message to the server apparatus, the subscription message including a request requesting subscription to presence information stored in the first storage unit; and a receiving unit configured to receive an encryption key that the multicast group uses for multicast communication from the second storage unit of the server apparatus, together with the presence information requested for subscription.

16. A communication method for managing an encryption key to be used for multicast communication between a plurality of terminals by using a server apparatus that includes a first storage unit and a second storage unit, the first storage unit being configured to store therein presence information, and the second storage unit being configured to store therein in associated manner a terminal identifier unique to each of the terminals and the encryption key, the communication method comprising:

receiving a subscription request message from a first terminal from among the terminals, the subscription request message requesting subscription to the presence information present in the first storage unit, and the subscription request message including a first terminal identifier unique to the first terminal;

acquiring the encryption key to be used for the multicast communication within the multicast group to which the first terminal belongs from the second storage unit by using the first terminal identifier; and transmitting acquired encryption key to the first terminal together with the presence information requested for subscription.

* * * * *